United States Patent [19]

Ando

[11] Patent Number: 5,619,730
[45] Date of Patent: Apr. 8, 1997

[54] PIPELINING DEVICE IN A PARALLEL PROCESSING APPARATUS AND AN INSTRUCTION SUPPLYING METHOD THEREFOR

[75] Inventor: Hideki Ando, Hyogo-ken, Japan

[73] Assignee: Mitsubishi Denki Kabushiki Kaisha, Tokyo, Japan

[21] Appl. No.: 300,235

[22] Filed: Sep. 6, 1994

Related U.S. Application Data

[63] Continuation of Ser. No. 779,176, Oct. 17, 1991, abandoned.

[30] Foreign Application Priority Data

Oct. 17, 1990 [JP] Japan ..................................... 2-279654

[51] Int. Cl.$^6$ ........................................................ G06F 12/00
[52] U.S. Cl. .............................................. 395/855; 395/496
[58] Field of Search ...................................... 395/375, 800, 395/325, 250; 364/230.3, 230.1; 365/78, 222, 221, 185

[56] References Cited

U.S. PATENT DOCUMENTS

| | | | |
|---|---|---|---|
| 3,665,422 | 5/1972 | McCoy et al. | 365/222 |
| 3,727,196 | 4/1973 | McKenny | 365/222 |
| 3,953,838 | 4/1976 | Gilberg et al. | 365/78 |
| 4,295,193 | 10/1981 | Pomerene | 395/375 |
| 4,374,428 | 2/1983 | Barnes | 395/250 |
| 4,423,482 | 12/1983 | Hargrove et al. | 395/325 |
| 4,476,525 | 10/1984 | Ishii | 395/375 |
| 4,521,851 | 6/1985 | Trubisky et al. | 395/375 |
| 4,591,971 | 5/1986 | Darlington et al. | 395/325 |
| 4,837,678 | 6/1989 | Culler et al. | 395/375 |

(List continued on next page.)

OTHER PUBLICATIONS

Microsoft Press Computer Dictionary Copyright 1994.
Groves et al, "An IBM Second Generation RISC Processor Architecture" Proceedings of the 35th COMCPON, IEEE 1990, pp. 162–170.
S. McGeady, "The 1960CA SuperScalar Implementation of the 80960 Architecture", Proceedings of the 35th COMPCON, IEEE 1990, pp. 232–240.
Grohoski, "Machine Organization of the IBM RISC System/6000 Processor", *IBM J. Res. Develop.*, vol. 34, No. 1, (Jan. 1990), pp. 37–58.

*Primary Examiner*—Kevin J. Teska
*Assistant Examiner*—Dan Fiul
*Attorney, Agent, or Firm*—Lowe, Price, LeBlanc & Becker

[57] ABSTRACT

A parallel processing apparatus of a superscalar type includes an instruction decoding stage which decodes four instructions simultaneously fetched from an instruction memory and issues instructions which allows simultaneous execution to related function units. The instruction decoding stage includes an instruction decoder which decodes the instruction and issues the instructions allowing simultaneous execution to the function units, and a queue which queues and stores the instructions fetched from the instruction memory. This instruction decoding stage also includes a scope logic which forms a read queue address for reading the instructions of the queue in accordance with the number of issued instructions in the instruction decoder and whether a branch is generated by a branch instruction, and a queue top logic which forms a write address in the queue in accordance with a storage state of an unissued available instruction in the queue. Instructions are read from four successive addresses starting from the read address. Fetched instructions are stored in four addresses in the queue starting from the write address. Four instructions to be decoded are always supplied to the instruction decoder in accordance with an issue state of the instructions. Four instructions are always fetched from the instruction memory and queued. Therefore, the instructions can be efficiently supplied to the instruction decoder in accordance with the execution state of the instructions.

6 Claims, 27 Drawing Sheets

PRIOR ART

U.S. PATENT DOCUMENTS

| | | | |
|---|---|---|---|
| 4,858,105 | 8/1989 | Kuriyama et al. | 395/375 |
| 4,864,543 | 9/1989 | Ward et al. | 365/221 |
| 4,907,198 | 3/1990 | Arima | 365/185 |
| 4,924,376 | 5/1990 | Ooi | 395/375 |
| 4,942,525 | 7/1990 | Shintani et al. | 395/375 |
| 4,967,343 | 10/1990 | Ngai et al. | 395/800 |
| 5,036,454 | 7/1991 | Rav et al. | 395/375 |
| 5,136,697 | 8/1992 | Johnson | 395/375 |
| 5,214,763 | 5/1993 | Blaner et al. | 395/375 |
| 5,295,249 | 3/1994 | Blaner et al. | 395/375 |
| 5,303,356 | 4/1994 | Vassiliadis et al. | 395/375 |

FIG. 3  PRIOR ART

| CYCLE | INSTRUCTION | |
|---|---|---|
| 1 | [1]  2  3  4 | ; ISSUANCE OF "1" |
| 2 | [2] [3]  4 | ; ISSUANCE OF "2"&"3" |
| 3 | [4] | ; ISSUANCE OF "4" |
| 4 | [5] [6]  7  8 | ; ISSUANCE OF "5"&"6" |
| 5 | [7] [8] | ; ISSUANCE OF "7"&"8" |
| 6 | - - - | |

FIG. 4

| CYCLE | INSTRUCTION | |
|---|---|---|
| 1 | [1]  2  3  4 | ; "1" ISSUED |
| 2 | [2] [3]  4  5 | ; "2"&"3" ISSUED |
| 3 | [4] [5] [6]  7 | ; "4"&"5"&"6" ISSUED |
| 4 | [7] [8]  9  10 | ; "7"&"8" ISSUED |
| 5 | | |

FIG. 5

(1)  [2] [3]  4  5  ; "2"&"3" ISSUED (2)  4  5  —  —  ; SHIFT IN INSTRUCTION REGISTERS (3)  4  5  6  7  ; FETCH OF INSTRUCTIONS INTO EMPTY INSTRUCTION REGISTERS

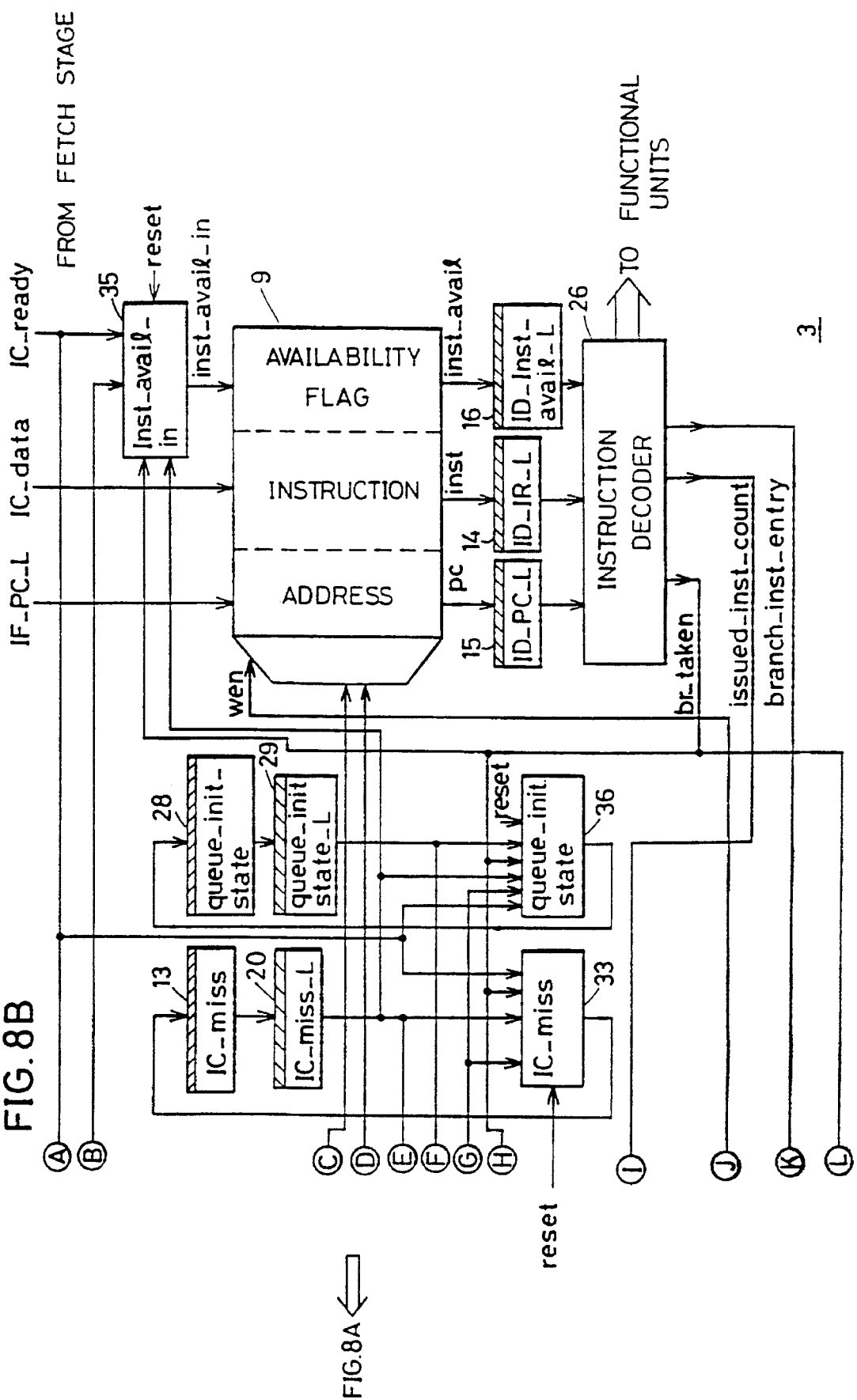

FIG.10

BASIC BEHAVIOR OF QUEUE, queue_top, scope

| QUEUE ADDRESS | 0 | 1 | 2 | 3 | 4 | 5 | 6 | 7 | 8 | 9 | 10 | 11 | |
|---|---|---|---|---|---|---|---|---|---|---|---|---|---|
| (1) INSTRUCTION | x | x | x | x | x | x | x | x | x | x | x | x | ⎫ |
| AVAIL. FLAG | 0 | 0 | 0 | 0 | x | x | x | x | x | x | x | x | ⎬ 1 CYCLE |
| queue_top | 1 | | | | | | | | | | | | |
| scope | 1 | | | | | | | | | | | | ⎭ |
| (2) INSTRUCTION | 0 | 1 | 2 | 3 | x | x | x | x | x | x | x | x | |
| AVAIL. FLAG | 1 | 1 | 1 | 1 | x | x | x | x | x | x | x | x | |
| queue_top | 1 | | | | | | | | | | | | |
| scope | 1 | | | | | | | | | | | | |
| (3) INSTRUCTION | 0 | 1 | 2 | 3 | 4 | 5 | 6 | 7 | x | x | x | x | |
| AVAIL. FLAG | 1 | 1 | 1 | 1 | 1 | 1 | 1 | 1 | x | x | x | x | |
| queue_top | | | | | 1 | | | | | | | | |
| scope | | | 1 | | | | | | | | | | |
| (4) INSTRUCTION | 0 | 1 | 2 | 3 | 4 | 5 | 6 | 7 | 8 | 9 | 10 | 11 | |
| AVAIL. FLAG | 1 | 1 | 1 | 1 | 1 | 1 | 1 | 1 | 1 | 1 | 1 | 1 | |
| queue_top | | | | | | | | | 1 | | | | |
| scope | | | | 1 | | | | | | | | | |
| (5) INSTRUCTION | 0 | 1 | 2 | 3 | 4 | 5 | 6 | 7 | 8 | 9 | 10 | 11 | |
| AVAIL. FLAG | 1 | 1 | 1 | 1 | 1 | 1 | 1 | 1 | 1 | 1 | 1 | 1 | |
| queue_top | 1 | | | | | | | | | | | | |
| scope | | | | 1 | | | | | | | | | |
| (6) INSTRUCTION | 12 | 13 | 14 | 15 | 4 | 5 | 6 | 7 | 8 | 9 | 10 | 11 | |
| AVAIL. FLAG | 1 | 1 | 1 | 1 | 1 | 1 | 1 | 1 | 1 | 1 | 1 | 1 | |
| queue_top | 1 | | | | | | | | | | | | |
| scope | | | | | | | 1 | | | | | | | x : UNDETERMINED

FIG.11

BEHAVIOR OF QUEUE, queue_top, scope WHERE A BRANCH TAKES PLACE

| QUEUE ADDRESS | 0 | 1 | 2 | 3 | 4 | 5 | 6 | 7 | 8 | 9 | 10 | 11 | |
|---|---|---|---|---|---|---|---|---|---|---|---|---|---|
| (11) INSTRUCTION | 10 | 11 | 0 | 1 | 2 | 3 | 4 | 5 | 6 | 7 | 8 | 9 | ⎫ 1 CYCLE |
| AVAIL FLAG | 1 | 1 | 1 | 1 | 1 | 1 | 1 | 1 | 1 | 1 | 1 | 1 | |
| queue_top | | | | | | | | | | | | | |
| scope | | | 1 | | | | | | | | | | |
| (12) INSTRUCTION | 10 | 11 | 0 | 1 | 2 | 3 | 4 | 5 | 6 | 7 | 8 | 9 | ; WHERE INSTRUCTION 2 IS A BRANCH INSTRUCTION AND A BRANCH THEREBY IS GENERATED |
| AVAIL FLAG | 1 | 1 | 1 | 1 | 0 | 0 | 0 | 0 | 1 | 1 | 1 | 1 | |
| queue_top | | | | | 1 | | | | | | | | |
| scope | | | | | 1 | | | | | | | | |
| (13) INSTRUCTION | 10 | 11 | 0 | 1 | 20 | 21 | 22 | 23 | 6 | 7 | 8 | 9 | ; BRANCH TARGET INSTRUCTION IS INSTRUCTION 20 |
| AVAIL FLAG | 1 | 1 | 1 | 1 | 1 | 1 | 1 | 1 | 1 | 1 | 1 | 1 | |
| queue_top | | | | | 1 | | | | | | | | |
| scope | | | | | 1 | | | | | | | | |

FIG. 12

BEHAVIOR OF QUEUE queue_top, scope WHERE INSTRUCTION MEMORY CANNOT SUPPLY INSTRUCTIONS ON RECEIPT OF REQUEST OF INSTRUCTION FETCH FROM A PROCESSOR

⎡― 1 CYCLE ―⎤

| QUEUE ADDRESS | 0 | 1 | 2 | 3 | 4 | 5 | 6 | 7 | 8 | 9 | 10 | 11 | 0 | 1 | 2 | 3 | 4 | 5 | 6 | 7 | |
|---|---|---|---|---|---|---|---|---|---|---|---|---|---|---|---|---|---|---|---|---|---|
| (21) INSTRUCTION | | | | | | | | | | | | | | | | | | | | | |
| AVAIL FLAG | | | | | | | | | 1 | 1 | 1 | 1 | 1 | 1 | 1 | 1 | 1 | 1 | 1 | 1 | |
| queue_top | 1 | | | | | | | | | | | | | | | | | | | | |
| scope | | | | | | | 1 | | | | | | | | | | | | | | ; NO INSTRUCTION IS SUPPLIED FROM INSTRUCTION MEMORY |
| (22) INSTRUCTION | | | | | | | | | | | | | | | | | | | | | |
| AVAIL FLAG | | | | | | | | | 1 | 1 | 1 | 1 | 0 | 0 | 0 | 0 | 1 | 1 | 1 | 1 | |
| queue_top | | | | | | | | | | | | 1 | | | | | | | | | |
| scope | | | | | | | | | | | | | | | | | | 1 | | | |
| (23) INSTRUCTION | | | | | | | | | | | | | | | | | | | | | ; WAITING FOR INSTRUCTION SUPPLY |
| AVAIL FLAG | | | | | | | | | 1 | 1 | 1 | 1 | 0 | 0 | 0 | 0 | 1 | 1 | 1 | 1 | |
| queue_top | | | | | | | | | | | | 1 | | | | | | | | | |
| scope | | | | | | | | | | | | | | | | | | | | 1 | |
| (24) INSTRUCTION | 8 | 9 | 10 | 11 | 12 | 13 | 14 | 15 | 4 | 5 | 6 | 7 | | | | | | | | | ; INSTRUCTIONS ARE SUPPLIED |
| AVAIL FLAG | 1 | 1 | 1 | 1 | 1 | 1 | 1 | 1 | 1 | 1 | 1 | 1 | | | | | | | | | |
| queue_top | | | | | 1 | | | | | | | | | | | | | | | | |
| scope | | | | | | | | | | | | 1 | | | | | | | | | |

FIG. 13

| reset | queue_init_state_L | br_taken_L | IC_fetch_miss_L | IC_ready | queue_avail | queue_top_in |
|---|---|---|---|---|---|---|
| 1 | x | x | x | x | x | 0 |
| x | 1 | x | x | x | x | queue_top_L |
| 0 | 0 | 1 | x | x | x | branch_inst_entry(*1) |
| 0 | 0 | 0 | 0 | x | x | queue_top_L |
| 0 | 0 | 0 | 1 | x | 1 | (*2) |
| 0 | 0 | 0 | 1 | 1 | 0 | queue_top_L |
| 0 | 0 | 0 | x | 1 | 1 | (*2) |
| 0 | 0 | 0 | x | 1 | 0 | queue_top_L |
| 0 | 0 | 0 | 0 | 0 | x | queue_top_L | x : ARBITRARY (*1) branch_inst_entry = QUEUE ADDRESS AT WHICH A BRANCH INSTRUCTION IS STORED
queue_state = NORMAL ( 2ND STATE OF QUEUE )

(*2) queue_top_in = queue_top_L+4 ;
if (queue_top_in>11)
{ queue_top_in=queue_top_in-12 ;
queue_state = REVERSE :if scope>11==0 ; else queue_state=NORMAL }

FIG.14

LOGIC OF SCOPE_NEXT (1) reset : scope_next = 0 ;

(2) br_taken : scope_next = branch_inst_entry ;

(3) else : scope_next = scope_L + NUMBER OF ISSUED INSTRUCTIONS (issued_inst_count) ;
if (scope_next > 11)
scope_next = scope_next - 12 ;

FIG.15

LOGIC OF IC_FETCH (1) /reset and /IC_busy ;  IC_fetch = 1 ;
(2) else.   IC_fetch = 0 ;

FIG.16

LOGIC OF OF IC_MISS

| reset | br_taken | IC_fetch_L | IC_ready | IC_miss |
|-------|----------|------------|----------|---------|
| 1     | x        | x          | x        | 0       |
| 0     | 1        | x          | x        | 0       |
| 0     | 0        | 1          | 0        | 1       |
| 0     | 0        | x          | 1        | 0       |
| 0     | 0        | 0          | 0        | IC_miss_L | x : ARBITRARY

FIG.17A

LOGIC OF QUEUE_AVAIL

| reset | br_taken | queue_full | queue-avail |
|-------|----------|------------|-------------|
| 1 | x | x | 1 |
| 0 | 1 | x | 1 |
| 0 | 0 | 0 | 1 |
| 0 | 0 | 1 | 0 | x : ARBITRARY

FIG.17B queue_full
--------- scope_next := SCOPE IN THE NEXT CYCLE
queue_top.in := QUEUE_TOP IN THE NEXT CYCLE

| (1) scope_next < queue_top_in : |
|---|
|     if (scope_next + 12 - queue_top_in >= 4 ) FALSE ; else TRUE ; |
| (2) scope_next > queue_top_in ; |
|     if ( scope_next - queue_top_in >= 4 ) FALSE ; else TRUE ; |
| (3) scope_next == queue_top_in ; |
|     if (queue_state == NORMAL ) FALSE else TRUE ; |

FIG.18A

<NORMAL STATE>

```
QUEUE    INSTRUCTION    POINTER
----------------------------------
  0
  1
  2          x           scope
  3          x
  4          x
  5          x
  6                      queue_top
  7
  8                              x : UN-ISSUED
  9                                  INSTRUCTION
 10
 11
```

FIG.18B

<AT NORMAL STATE, SCOPE_NEXT = QUEUE_TOP_IN>

```
QUEUE    INSTRUCTION    POINTER
----------------------------------
  0
  1
  2
  3
  4
  5
  6                      scope_next
                         queue_top_in
  7
  8
  9
 10
 11
```

FIG. 19A

<REVERSE STATE>

| QUEUE | INSTRUCTION | POINTER |
|---|---|---|
| 0 | x | |
| 1 | x | |
| 2 | | queue_top |
| 3 | | |
| 4 | | |
| 5 | | |
| 6 | x | scope |
| 7 | x | |
| 8 | x | |
| 9 | x | |
| 10 | x | : x : UN-ISSUED |
| 11 | x | INSTRUCTION |

FIG. 19B

<AT REVERSE STATE SCOPE_NEXT = QUEUE_TOP_IN>

| QUEUE | INSTRUCTION | POINTER |
|---|---|---|
| 0 | x | |
| 1 | x | |
| 2 | x | |
| 3 | x | |
| 4 | x | |
| 5 | x | |
| 6 | x | scope_next<br>queue_top_in |
| 7 | x | |
| 8 | x | |
| 9 | x | |
| 10 | x | |
| 11 | x | : x : UN-ISSUED<br>INSTRUCTION |

FIG. 20

| | |
|---|---|
| (1) reset = 1 ;<br>queue_state = NORMAL | ──────── ← scope<br>queue_top |
| (2) queue_top > 11 == 1<br>scope > 11 == 0 ;<br>queue_state = REVERSE | ⤶ ── queue_top_in<br>── ← scope_next<br>── queue_top |
| (3) scope > 11 == 1 ;<br>queue_state = NORMAL | ⤶ ── ← scope_next<br>── ← queue_top_in<br>── ← scope |
| (4) br_taken = 1 ;<br>queue_state = NORMAL | br ──── ← scope<br>queue_<br>top |

FIG. 21

| reset | br_taken | IC_fetch_L | IC_miss_L | inst_avail_in |
|---|---|---|---|---|
| 1 | x | x | x | 0 |
| 0 | 1 | x | x | 0 |
| 0 | 0 | 1 | x | IC_ready |
| 0 | 0 | x | 1 | IC_ready |
| 0 | 0 | 0 | 0 | 0 | x : ARBITRARY

| reset | br_taken | IC_fetch_L | IC_miss_L | IC_ready | queue_init_state |
|---|---|---|---|---|---|
| 1 | x | x | x | x | 1 |
| x | 1 | x | x | x | 1 |
| 0 | 0 | 1 | x | 0 | 1 |
| 0 | 0 | 1 | x | 1 | 0 |
| 0 | 0 | x | 1 | 0 | 1 |
| 0 | 0 | x | 1 | 1 | 0 |
| 0 | 0 | 0 | 0 | x | queue_init_state_L | x : ARBITRARY

FIG. 27

| IC1 0 | IC2 0 | IC3 0 | IC4 0 | ... | IC1 31 | IC2 31 | IC3 31 | IC4 31 |

0-TH BIT ... 31ST BIT

FIG. 28

| PC1 0 | PC2 0 | PC3 0 | PC4 0 | ... | PC1 31 | PC2 31 | PC3 31 | PC4 31 |

0-TH BIT ... 31ST BIT

FIG. 29

| inst_avail_in_0 | inst_avail_in_1 | inst_avail_in_2 | inst_avail_in_3 |

(a) scope (b) READING WORD LINE RD (c) READING BIT LINE RB (a) queue_top (b) WRITING WORD LINE WD (c) WRITE-IN PULSE wp (d) WRITING BIT LINE WB

PIPELINING DEVICE IN A PARALLEL PROCESSING APPARATUS AND AN INSTRUCTION SUPPLYING METHOD THEREFOR

This application is a continuation of application Ser. No. 07/779,176 filed Oct. 17, 1991, now abandoned.

BACKGROUND OF THE INVENTION

1. Field of the Invention

The present invention relates to a parallel processing apparatus, and particularly to an improvement for efficiently supplying instructions in processors of a superscalar type.

2. Description of the Background Art

In recent years, microprocessors have been remarkably advanced, and particularly their performance and operation speed have been increased. However, high speed of semiconductor memories has not been increased enough to follow the increased operation speed of the microprocessors, and thus the access of the semiconductor memories provides bottle neck against increasing the speed of the processors. Therefore, parallel processing has been employed for improving the performance of the microprocessors.

As a method for achieving the parallel processing, there is a processing method called as a superscalar. A processor of this superscalar type (will be called merely as a "superscalar") has a construction, as shown in FIG. 1, in which a scheduler 200 in the superscalar detects parallelism in an instruction stream to supply instructions which can be processed in parallel to parallel pipelines P1, P2 and P3. That is; the superscalar is a processing device having following features.

(1) It fetches simultaneously a plurality of instructions.

(2) It has a plurality of function units (pipe lines) and can execute simultaneously a plurality of instructions.

(3) It finds simultaneously executable instructions among a plurality of fetched instructions, and simultaneously dispatches these simultaneously executable instructions to related function units (pipe lines).

FIG. 2 shows a general construction of a superscalar. In FIG. 2, the superscalar includes a plurality of function units 4, 5, 6 and 7 which perform predetermined functions, respectively, as well as instruction memory 1 for storing instructions, an instruction fetching (IF) stage 2 for fetching simultaneously a plurality of instructions from the instruction memory 1 and an instruction decoding (ID) stage 3 which receives instructions fetched by the instruction fetching stage 2. The instruction decoding stage 3 finds simultaneously executable instructions among the instructions and dispatches them to corresponding function units. The superscalar further includes a data memory 8 for storing results of processing and others. The instruction memory 1 includes a cache memory and an external memory, and can perform high-speed reading of the instructions in a case of cache hit, i.e., if required instructions exist in the cache memory.

The instruction fetching stage 2 supplies an instruction pointer (IF_PC) to the instruction memory 1 to fetch the instructions corresponding to this instruction pointer IF_PC from the instruction memory 1.

The instruction decoding stage 3 includes an instruction decoder and a pipeline sequencer. The instruction decoder receives the fetched instructions from the instruction fetching stage 2 and decodes them. The pipeline sequencer (instruction scheduler) identifies, for example, machine types of the decoded instructions and dispatches simultaneously the instructions of different machine types to corresponding function units. The machine type is information for representing a function unit by which a particular instruction is processed.

Each of the function units 4–7 has a pipeline configuration, and executes an applied instruction in response to clock signals. In an example shown in FIG. 2, four function units are provided, and parallel processing of up to 4 instructions can be performed. The function units 4 and 5 are integer operational units for performing integer addition or others and include executing stages EX for executing the integer arithmetic and writing stages WB for writing results of executed processing into data registers.

The function unit 6 is provided for executing access (i.e., loading or storing of data) to the data memory 8, and includes an address forming stage (ADR), an access executing stage (MEM) for the data memory 8 and a writing stage (WB) for writing the data in a data register (not shown). In the writing stage (WB), loading of the data is performed.

A function unit 7 is provided for executing, e.g., a floating-point addition, and includes three executing stages (EX1, EX2 and EX3) and a writing stage (WB) for writing the execution result in data register. The floating-point number is a number expressed by an index and mantissa and having a point which is not fixed. The execution of the floating point arithmetic operation requires more cycles than the integer arithmetic and others.

In this parallel processing apparatus, each step has a pipeline configuration, and the operation periods for instruction fetching, instruction decoding, instruction executing and data writing overlap each other. Therefore, an instruction fetched from the instruction memory will be decoded by the instruction decoding stage in a next cycle. An operation will be briefly described below.

The instruction decoding stage 3 supplies an instruction fetch request to the instruction fetching stage 2. The instruction fetching stage 2 supplies the instruction pointer IF_PC to the instruction memory 1 in response to this instruction fetch request and fetches a plurality of instructions corresponding to the instruction pointer IF_PC from the instruction memory 1. These fetched instructions are simultaneously supplied to the instruction decoding stage 3, which in turn simultaneously decodes these supplied instructions. Among the decoded instructions, the instruction decoding stage 3 detects instructions, which include non-competitive calculation resources and data registers and thus allows parallel processing, and issues or dispatches these instructions allowing parallel processing to the corresponding function units, respectively.

The function units supplied with the instructions execute the parallel processing in accordance with the instructions. The processing in the function units 4–7 are executed in a pipeline manner, and are executed sequentially in the respective stages shown in FIG. 2. Operations of the instruction fetching stage 2, instruction decoding stage 3 and instruction executing stage (function units 4–7) are performed in the pipeline manner, and overlap each other when predetermined operations are performed.

The operations of the respective stages in the pipeline manner and the parallel processing by the function units, which are described above, enable high-speed execution of the instructions.

Processors having parallel processing capability are disclosed, for example, in (1) "The i960CA Superscalar Implementation of the 80960 Architecture", by S. McGeagy, Proceedings of 35th COPMCON, IEEE 1990, pp 232–240, and (2) "An IBM Second Generation RISC Processor Architecture", by R. D. Groves, Proceedings of 35th COMPCON, IEEE 1990, pp 162–170. The above prior art (1) discloses a processor which simultaneously fetches four instructions, and can simultaneously execute three instructions by function units of REG, MEM and CTRL.

The prior art (2) discloses a RISC processor which simultaneously fetches four instructions. This RISC processor includes a floating-point processor, fixed point processor, branch processor and control unit, and can simultaneously execute the four instructions.

As described above, in the superscalar, a plurality of instructions are fetched, and a plurality of instructions are simultaneously executed, so that the processing speed can be increased as compared with ordinary computers. For example, in the construction shown in FIG. 2, when the four instructions which are simultaneously fetched are executed in parallel by the four function units 4–7, the four instructions can be processed in 4 clock cycles (in a case that the pipelines of the function units 4, 5 and 6 are in a waiting condition until the termination of the processing of the function units 7).

Although the instruction scheduler (or the pipeline sequencer included in the instruction decoding stage) executes the scheduling of instructions for efficiently executing the parallel processing, the instructions which are simultaneously fetched may not be simultaneously executed. As an example, instructions having following data dependency will be reviewed.

(1) add R1, R2, R3; R2+R3=R1

(2) sub R4, R1, R5; R1_R5=R4

The above instruction (1) serves to add a content of the register R3 to a content of the register R2 and to write a result of addition in the register R1. Here, the superscalar is one of RISCs, and has a register file. The operation is executed using a register of the register file. Access to a memory (data memory) is performed only by loading and storing instructions.

The above instruction 2 serves to subtract a content in the register R5 from a content in the register R1, and write a result of the subtraction in the register R4. The operation by these instructions 1 and 2 correspond to the processing of, for example, (x+y—z).

When the instructions 1 and 2 are simultaneously fetched, they commonly use the register R1 and the instruction 2 uses the result of the execution of the instructions 1, so that these instructions 1 and 2 cannot be simultaneously executed. If there is such data dependency between the instructions, conditions of issue of instructions (i.e., a form of issue of the instructions from the instruction decoding stage to the function units) can be as shown in FIG. 3.

FIG. 3 shows conditions in which only the instructions allowing simultaneous processing are issued. The simultaneously issued instructions are determined in an order from a smaller address to a larger address (from left to right in the Figure).

In FIG. 3, numerals encircled by squares represent instructions which can be issued without mutual data dependency.

In a cycle 1 shown in FIG. 3, the instructions 2, 3 and 4 have data dependency on each other or on the instruction 1. Therefore, the instructions 2, 3 and 4 cannot be issued, and only the instruction 1 is issued.

In a cycle 2, the instruction 4 has the data dependency on the instruction (2) and/or (3) and the instructions 2 and 3 have not mutual data dependency, so that the instructions 2 and 3 are issued.

In a cycle 3, the remaining instruction 4 is issued.

In a cycle 4, four instructions 5–8 which are newly fetched are decoded, and the instructions 5 and 6 having no mutual data independency are issued.

In a cycle 5, the instructions 7 and 8 do not have the mutual data dependency, and thus are issued. In a scheme shown in FIG. 3, fetching of the instructions is delayed until the last instructions 1–4 which were simultaneously fetched are entirely issued, in which case it requires five cycles between the issue of all the first fetched instructions 1–4 and the issue of all the subsequently fetched instructions 5–8. Therefore, in such an instruction supplying and issuing method, emptiness is formed in the pipelines, and thus the high-speed processing efficiency of the parallel processing apparatus is impaired.

Even in this case, if there were no data dependency between the instruction 4 and the instructions 5 and 6 in FIG. 3, and a given number of instructions could be fetched from the instruction memory, an instruction issue scheme shown in FIG. 4 would be allowed. FIG. 4 shows instruction issue conditions in an improved issue scheme.

Referring to FIG. 4, the instruction 1 among the simultaneously fetched four instructions 1–4 is issued in the cycle 1.

In the cycle 2, a new instruction 5 is supplied, and the instructions 2–5 are decoded. Among the four instructions 2–5, the instructions 2 and 3 having no dependency are issued.

In the cycle 3, new instructions 6 and 7 are supplied, and the instructions 4–7 are decoded. In accordance with a result of decoding, instructions 4, 5 and 6 are issued.

In the cycle 4, new instructions 8, 9 and 10 are supplied and the instructions 7–10 are decoded. In accordance with the result of this decoding, the instructions 7 and 8 are issued.

In the instructions issuing scheme shown in FIG. 4, only four cycles are required for issuing the eight instructions 1–8, and high-speed processing can be executed as compared with the scheme shown in FIG. 3. As one of methods for achieving the instruction issue scheme shown in FIG. 4, a method shown in FIG. 5 can be contemplated. FIG. 5 shows procedures for supplying instructions, by which the instruction issue conditions shown in FIG. 4 can be achieved.

In a step (1) shown in FIG. 5, when instructions 2 and 3 among the instructions 2–5 held by an instruction register, which is employed for holding the instructions, are issued, emptiness is formed in the instruction register.

In a step (2), a content of the instruction register is shifted by a number corresponding to the number of the empty registers. That is; in the step (2) in FIG. 5, register positions of the instructions 4 and 5 are respectively shifted leftward by two.

In a step (3), subsequent instructions 6 and 7 are fetched into these empty instruction registers. The steps (1)–(3) shown in FIG. 5 must be executed in one cycle. A construction shown in FIG. 6 may be contemplated for performing the instruction shifting operation shown in FIG. 5.

In FIG. 6, an instruction decoding stage includes instruction registers R1–R8 for storing the instructions, a barrel shifter BR for shifting the applied instructions and an instruction decoder ID. The instruction registers IR1–IR4 store the instructions fetched by the instruction fetching stage 2 and the instructions shifted by the barrel shifter. The instruction registers IR5–IR8 accommodate the instructions applied to the instruction decoder ID without decoding. The barrel shift BR shifts the instructions from the instruction registers IR5–IR8 in accordance with information of issued instruction count from the instruction decoder ID.

Usually, the parallel processing apparatus operates in accordance with clock signals T and L in two phases without mutual overlapping. An operation will be briefly described below.

Instructions which were fetched in the last cycle are held in the instruction registers IR1–IR4 in response to the clock signal T. The holding instructions of the instruction registers IR1–IR4 are applied to and decoded by the instruction decoder ID, and are issued to the instruction units in accordance with a decoded result.

The instruction registers IR5–IR8 are responsive to the clock signal to hold the instructions applied to the instruction decoder ID and apply the same to the barrel shifter BR. The barrel shift BR responds to the information of the issued instruction count from the instruction decoder ID by shifting the instructions applied from the instruction registers IR5–IR8. The contents of the barrel shifter BR are applied to and held by the instruction registers IR1–IR4 in response to the subsequent clock signal T.

In this case, the barrel shifter is required to complete the shifting operation for the instructions in a period between the clock signal L and the subsequent clock signal T. In the barrel shifter BR, however, an instruction length is long (e.g., 32 bits; the instruction length is fixed in RISC), so that the instruction shifting operation cannot be performed at a high-speed and requires a long period of time. Therefore, it is impossible to apply the instructions to the instruction registers IR1–IR4 to be held therein in response to the subsequent clock signal T, and thus it is impossible to supply the instructions to the instruction decoder ID at a high speed, which impairs the high-speed operability of the parallel processing apparatus.

The instruction memory is required to obtain information of a number of the empty registers in the instruction registers IR1–IR4 and determine the instruction supply number and the instruction supply positions based on this information. The information relating to the number of the existing empty registers in the instruction registers RI1–RI4 is obtained by the issued instruction count information from the instruction decoder ID. However, this issued instruction count information is issued after the decoding operation by the instruction decoder ID. Therefore, it requires a long time to determine the instruction supply number and instruction supply positions by the instruction memory, and a timing for starting the determining operation is delayed. Therefore, it requires a long period of time for fetching the desired instructions, and increased period of the clock signals T and L is required for executing the instructions without disturbing the pipeline architecture, which impairs the high-speed operability of the parallel processing apparatus.

SUMMARY OF THE INVENTION

Accordingly, an object of the invention is to provide a parallel processing apparatus capable of efficiently performing parallel processing.

Another object of the invention is to provide a parallel processing apparatus provided with an instruction supplying device capable of efficiently performing parallel processing.

Still another object of the invention is to provide an instruction supplying device for improving a parallel processing performance of a processor of a superscalar type.

Yet another object of the invention is to provide an instruction supplying method for improving a parallel processing performance in a parallel processing apparatus.

Further another object of the invention is to provide an instruction supplying method for improving a parallel processing performance in a parallel processing apparatus of a superscalar type.

An instruction supplying device in a parallel processing apparatus according to the invention includes means for forming an availability flag indicating availability/unavailability of an instruction in response to a signal which indicates whether the instruction is supplied from an instruction memory device or not, a reset signal and branch generation indicating information which indicates generation of branch; and memory means for simultaneously storing a plurality of instructions, which are simultaneously fetched from an instruction memory as well as addresses and availability flags of the simultaneously fetched instructions in said instruction memory. This memory means includes a plurality of entry storing regions, of which each entry is formed of one instruction, a corresponding address and a corresponding availability flag. This memory means further includes a plurality of input ports to which respectively different write entry contents are simultaneously transmitted, a plurality of output ports to which respectively different read entry contents are simultaneously transmitted, and means for coupling a plurality of write entries and a plurality of read entries to the input ports and the output ports in response to write queue addresses and read queue addresses, respectively.

This instruction supplying device further includes means for generating said write queue addresses and read queue addresses in response to issued instruction count information, a branch generation indicating signal and an instruction supply indication signal indicating a fact that an instruction is supplied, respectively.

Contents of the entries which are simultaneously read from the memory means are applied to the instruction decoding device.

The memory device includes the input ports and output ports which can be individually accessed. Through these output ports, a plurality of instructions which are simultaneously fetched from the instruction memory are stored together with the addresses and the availability flags in the different entry regions, respectively.

A plurality of entry regions are simultaneously selected from these entry storing regions in response to the read queue addresses and are connected to the different output ports, respectively, whereby a plurality of entry contents are simultaneously read.

Since these input ports and output ports are individually accessible, writing and reading for the entries can be simultaneously executed. The write queue addresses and read queue addresses are selected in accordance with the conditions of issue of the instructions and the conditions of supply of the instructions from the instruction memory, and a constant number of instructions are always applied to the instruction decoding device as issue target instructions. The availability flags determine whether the issue of the instructions are allowed.

In this manner, an appropriate number of instructions which compensates the issued instructions are always supplied simultaneously to the instruction decoding device, and thus the instruction supply can be efficiently conducted, which enables high-speed execution of the instructions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows an instruction supplying scheme in a prior art parallel processing apparatus;

FIG. 4 shows an instruction supplying scheme intended by the present invention;

FIG. 5 shows an instruction supplying scheme which can be contemplated for achieving an instruction supplying scheme shown in FIG. 4;

FIGS. 8(A) and 8(B) show a construction of an instruction supplying stage in a parallel processing apparatus of an embodiment of the invention;

FIG. 10 shows fundamental movement of addresses of a queue in a parallel processing apparatus according to the invention;

FIG. 11 shows movement of write/read addresses and availability flags in a queue in a parallel processing apparatus of the invention; FIG. 12 shows movement of write/ read addresses and availability flags in a queue when an instruction fetch request is issued and an instruction supply is not performed in,a parallel processing apparatus of the invention;

FIG. 13 is a list showing logic for achieving queue-top logic shown in FIG. 8;

FIG. 14 is a list showing logic for achieving scope next logic shown in FIG. 8;

FIG. 15 is a list showing logic for achieving instruction fetch logic shown in FIG. 8;

FIG. 16 is a list showing logic for achieving instruction miss logic shown in FIG. 8;

FIG. 17A is a list showing logic for achieving queue avail logic shown in FIG. 8;

FIG. 17B is a list showing a logic operation for achieving queue full contained in FIG. 17A;

FIGS. 18A and 18B shows a second state of a queue;

FIGS. 19A and 19B shows a third state of a queue;

FIG. 20 is a list showing logic for achieving queue state logic shown in FIG. 8;

FIG. 21 is a list showing instruction avail logic of a queue shown in FIG. 8;

FIG. 27 shows an example of a layout configuration of an instruction applied to a queue;

FIG. 28 shows an example of a layout configuration of an available address applied to a queue;

FIG. 29 shows an example of a layout configuration of availability flags applied to a queue;

DETAILED DESCRIPTION OF THE PREFERRED EMBODIMENTS

Figure 7:
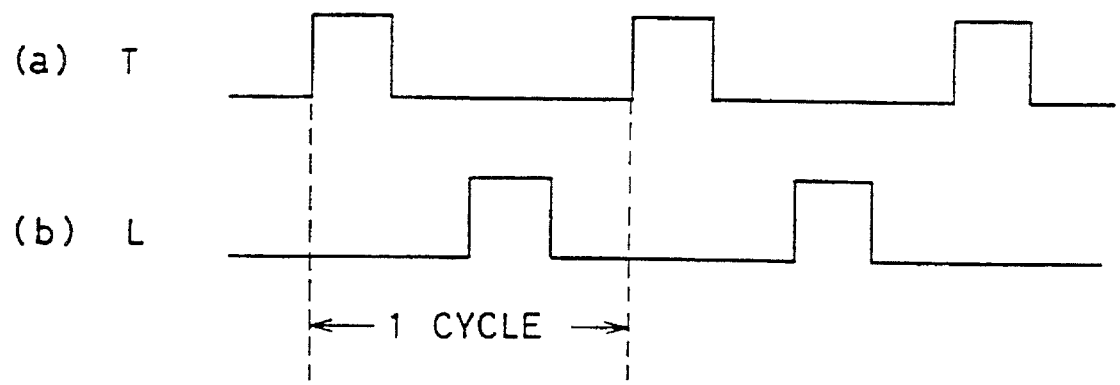
FIG. 7 shows two-phase clocks used in an parallel processing apparatus.
Figure 8A:
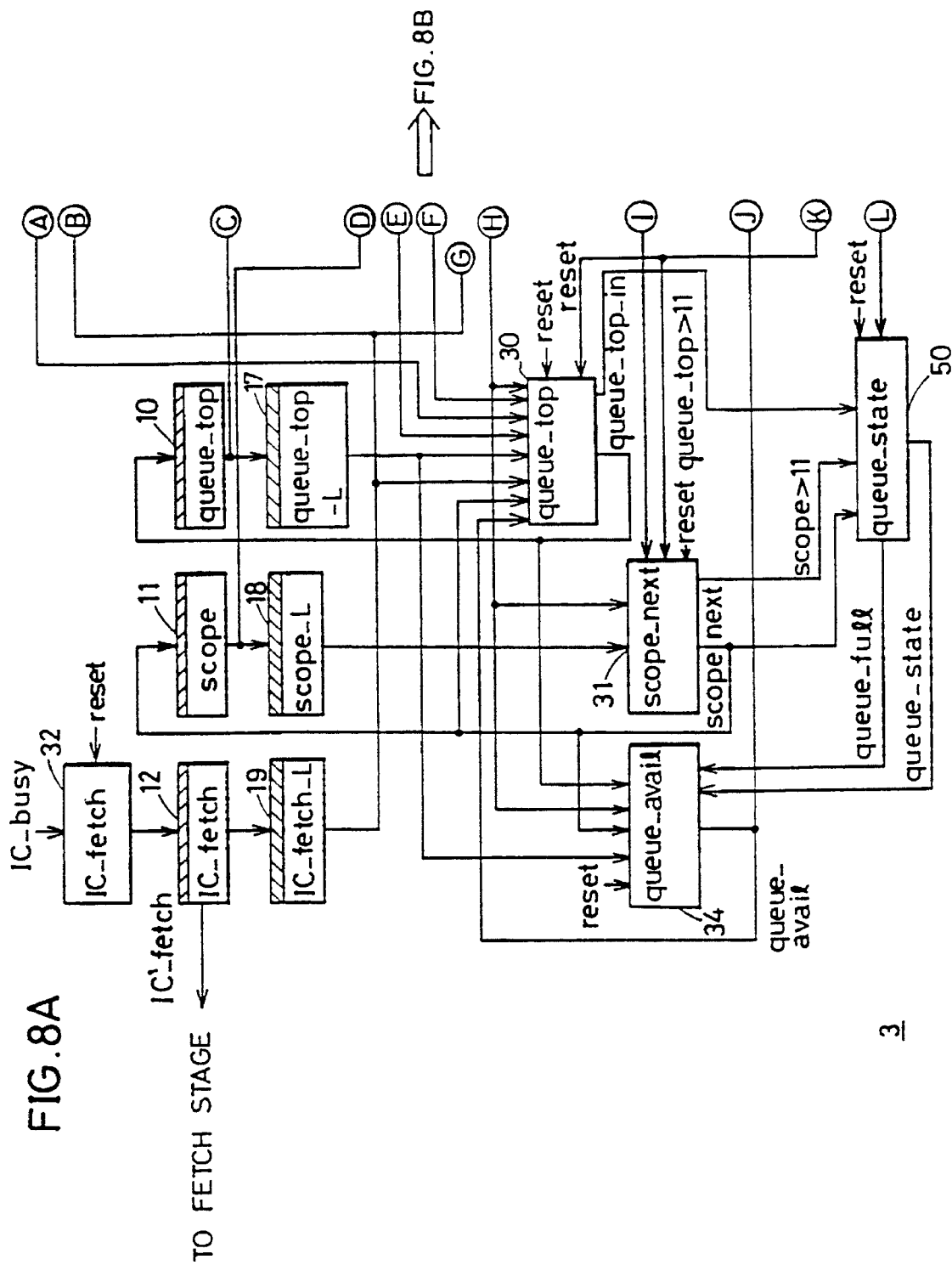

FIG. 8 shows a construction of a major part of a superscalar which is one of parallel processing apparatuses and an embodiment of the invention. The construction shown in FIG. 8 corresponds to an instruction decoding stage of the superscalar. The device shown in FIG. 8 operates in response to the clock signals T and L at two phases which do not overlap each other (see FIG. 7).

Figure 1:
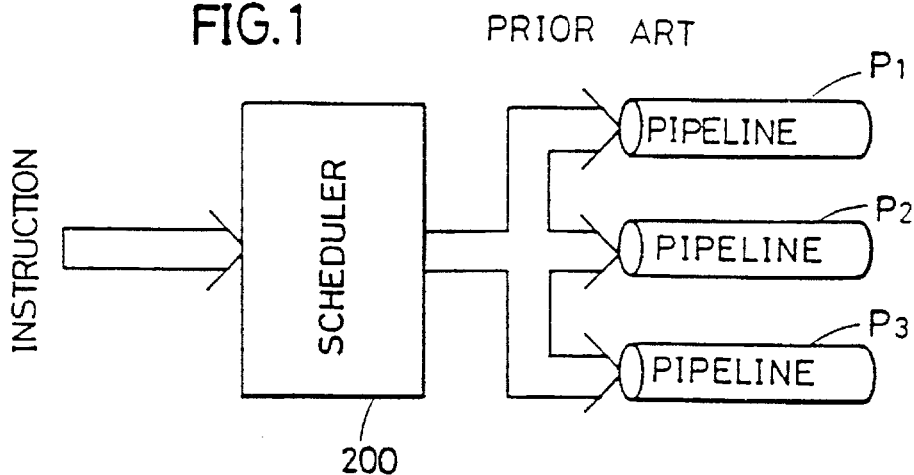
FIG. 1 shows a conceptional construction of a parallel processing apparatus.
Figure 2:
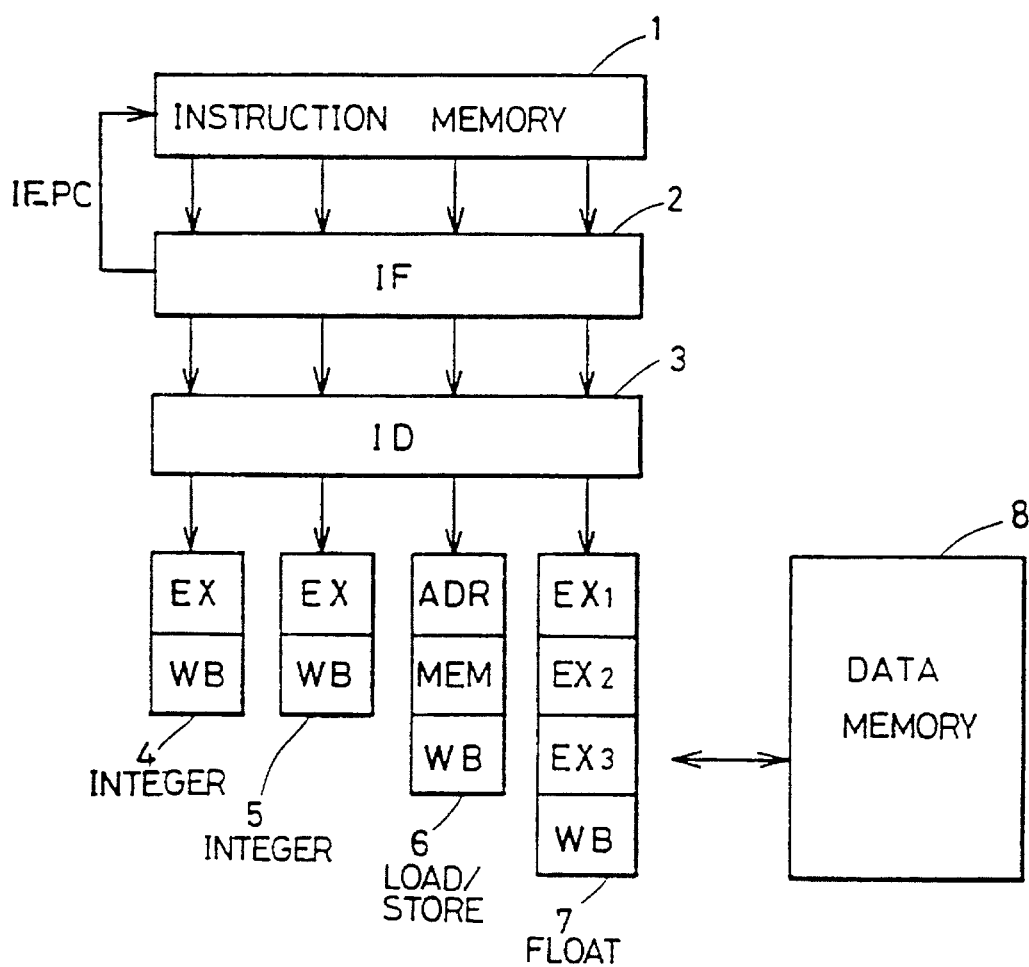
FIG. 2 shows a general construction of a parallel processing apparatus.
Figure 6:
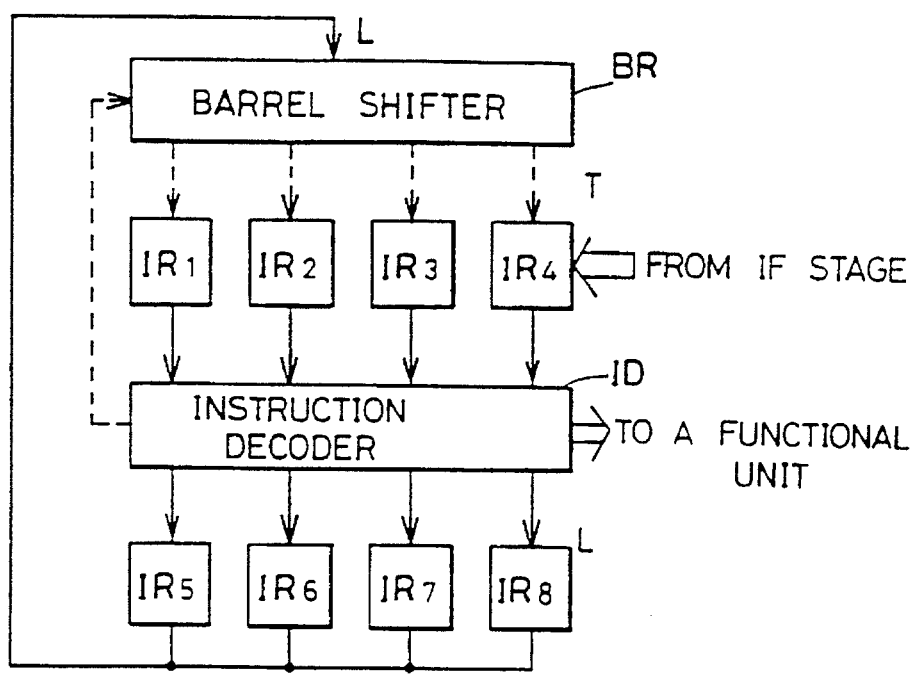
FIG. 6 shows an example of a construction for achieving an instruction supplying scheme in FIG. 5.

Although not shown, the instruction fetching stage (see FIG. 2) fetches a plurality of (four in this embodiment) instructions from an instruction memory in accordance with an instruction fetch request from an instruction decoding stage. A fetched instruction IC_data and a logic address IF_PC_L of this fetched instruction are supplied to the decoding stage together with a signal IC_ready which indicates a fact that the instruction is supplied from the instruction memory. The logic address IF_PC_L of the fetch instruction is supplied from a pointer which forms an address in the instruction memory and is included in the instruction fetching stage.

The instruction memory generates and applies a signal IC_busy to the decoding stage, for example, in such conditions that access to a low-speed main memory (or an external memory) is carried out due to cache miss or the instruction memory is accessed. The above signal IC_busy indicates that the main memory cannot accept the instruction fetch request.

Referring to FIG. 8, an instruction supplying device, which is an embodiment of the invention, includes a queue 9 formed of a random access memory (RAM) which stores, as one entry, the logic address (IF_PC_L) of an instruction fetched from the instruction memory, a fetched instruction (IC_data) and an availability flag (inst_avail) indicating availability and unavailability of the fetched instruction. The queue p, of which construction will be described in greater detail later, can store, for example, 12 entries and has a plurality of write ports and a plurality of read ports. Owing to these plurality of write and read ports, contents of a plurality of (four in this embodiment) continuous entries can be simultaneously written or read by designating one write gate and one read gate.

In order to control the reading and writing of the instruction in and from the queue 9 as well as availability and unavailability of the stored instruction, there are provided T-latch circuits 11, 12, 13 and 28 for holding applied signals in response to the clock signals T, L-latch circuits 17, 18, 19, 20 and 29 which are provided correspondingly to the respective T-latch circuits 10–13 and 28 for holding output data (held data) of the corresponding T-latch circuits in response to the clock signals L. There are further provided logic circuits 30, 31, 32, 33, 34, 35, 36 and 50 which generate signals, read and write addresses of the queue 9, operation control signals and signals indicating availability/unavailability of the instructions, based on held data of the respective L-latch circuits 17–20 and 29, signals br_taken, issued_inst_count and branch_inst_entry from the instruction decoder 26.

The T-latch circuit 10 (will be called as a "queue top latch 10") is responsive to the clock signal T to hold an address queue_top which indicates first addresses of a plurality of entries in which instructions fetched by the queue 9 from the instruction memory is to be written. When simultaneously fetched four instructions are stored in the queue 9, the instructions, their logic addresses and their availability flags are written in following addresses of the queue 9:

queue_top, queue_top+1, queue_top+2, queue_top+3 wherein "+" represent module addition with respect to a whole entry number (12 in this embodiment) of the queue 9.

The L-latch circuit 17 (will be called as a "queue top L-latch 17") holds the held data of the queue top latch 10 in response to the clock signal L.

The T-latch circuit 11 (will be called as a "scope latch 11") is responsive to the clock signal T to hold, by the clock signal T, the address of the queue 9 in which a first one entry among four entries to be simultaneously read from the queue 9 is registered. That is; the contents of the entries of the following addresses of the queue 9 are simultaneously read:

scope, scope+1, scope+2, scope+3 wherein "+" represent module addition with respect to the whole entry number (12 in this embodiment) of the queue 9.

The T-latch circuit (will be called as an "instruction fetch latch") 12 is responsive to the clock signal T to hold a flag IC_fetch indicating the execution of the instruction fetch. In a cycle in which the instruction fetch request flag IC_fetch is "1", an instruction fetch request is issued to the instruction fetching stage.

The L-latch circuit (will be called as an "instruction fetch L-latch") 19 is responsive to the clock signal L to hold the flag IC_fetch latched in the instruction fetch latch 12.

The T-latch circuit (will be called as an "instruction miss latch") 13 is responsive to the clock signal T to hold the flag IC_miss which indicates a state for waiting an instruction from the instruction memory.

The L-latch circuit (will be called as an "instruction miss L-latch") 20 is responsive to the clock signals L to hold the flag IC_miss held by the instruction miss latch 13.

The T-latch circuit (will be called as an "initial state latch") 28 is responsive to the clock signal T to hold the flag queue_init_state which indicates an initial state of the queue 9.

The L-latch circuit (will be called as a "queue initial state L-latch") 29 is responsive to the clock signal L to hold the flag queue_init_state held by the queue initial state latch 28.

The logic circuit 30 (will be called as a "queue top logic 30") responds to a branch generating signal br_taken from the instruction decoder 26, the queue initial state flag queue_init_state held by the queue initial state L-latch 29, the signal IC_ready, the write top address queue_top of the queue 9 from the queue top L-latch 17, and the flag IC_fetch from the instruction fetch L-latch 19. The queue top logic 30 is also responsive to the read top address scope_next of the queue 9 in the next cycle from the logic circuit 31, as well as the flag queue_avail, which indicates whether the queue 9 is available (writable), from the logic circuit 34 and the address branch_inst_entry of the entry at which the branch instruction is registered and which is generated from the instruction decoder 26. In response to the same, the queue top logic 30 forms the write top address queue_top_in of the queue 9 in the next cycle and applied the same to the queue top latch 10 and the logic circuits 34 and 50.

The logic circuit 31 (will be called as a "scope next logic 31") is responsive to the signal br_taken, the read top address scope_L from the scope L-latch 18, the issued instruction count data issued_inst_count and the address branch_inst_entry from the instruction decoder 26. In response to the same, the scope next logic 31 generates the write top address scope-next of the queue 9 in the next cycle, and also generates a flag scope>11 which indicates a fact that this address scope_next is larger than 11. The signal scope_next indicating the address scope in the next cycle is applied to the scope latch 11 and the logic circuit 50 and is also applied to the logic circuit 34. The flag scope>11 is applied to the logic circuit 50.

The logic circuit 33 (will be called as an "instruction miss logic 33") is responsive to a flag IC_fetch_L from the instruction fetch L-latch 19, a flag IC_miss_L from the instruction miss L-latch 20, the flag br_taken and the signal IC_ready. In response to the same, the instruction miss logic 33 forms and applies to the instruction miss latch 13 a signal IC_miss indicating whether it is a state for waiting an instruction.

The logic circuit 36 (will be called as a "queue initialization logic 36") is responsive to the signal queue_init_state_L from the queue initial state L-latch 29, the signal br_taken, the signal IC_miss_L from the instruction miss latch 20, the signal IC_fetch_L from the instruction fetch L-latch 19 and the signal IC_ready. In response to the same, the queue initialization logic 36 forms and applies to the queue initial state latch 28 the signal queue_init_state indicating whether the queue 9 is in an initial state.

The logic circuit 34 (will be called as a "queue avail logic 34") is responsive to the address queue_top_L from the queue top L-latch 17, the address scope_next from the scope next logic 31, the signal br_taken, the address queue_top_in from the queue top logic 30 and the signal queue_state indicating the state (first, second or third state which will be described later) of the queue 9 from the logic circuit 50. In response to the same, the queue avail logic 34 generates and applies to the queue top logic 30 the signal queue_avail indicating whether the queue 9 is available.

The logic circuit 32 (will be called as an "instructions fetch logic 32") is responsive to the signal IC_busy which is applied from the instruction memory or the instruction fetching stage and indicates the state in which the instruction memory cannot accept the instruction fetch request. In response to the same, the instruction fetch logic 32 generates and applies to the instruction fetch latch 12 the signal IC_fetch indicating whether the fetch request is to be supplied to the instruction memory.

The logic circuit 35 (will be called as an "instruction avail logic 35") is responsive to the signal IC_ready, signal IC_fetch_L, signal br_taken and signal IC_miss_L to generate the flag inst_avail_in indicating whether the instruction contained in the queue 9 is available and to determine a value of the availability flag inst_avail in the entry of the queue 9.

The logic circuit 50 (will be called as a "queue state logic 50") is responsive to the address branch_inst_entry from the instruction decoder 26 and the flag queue_top>11 from the queue top logic 30, as well as the flag scope>11 and address scope_next from the scope next logic 31. In response to the same, the queue state logic 50 generates the signal queue_state indicating an actual state of the queue 9 among the first, second and third states, and applies it to the queue avail logic 34. In the first state described above, the queue 9 is in an initial state, the write top address queue_top and read top address scope thereof are "0" or equal to each other, and all the availability flags inst_avail of the four entries from the address queue_top are OFF (0). This state is one of the reset state, branch generating state and instruction arrival waiting state. In the second state, the read top address scope is equal to or less than the read top address queue_top, i.e., a following relationship is established:

scope<queue_top

This state is a normal state.

In the third state, the write top address queue_top is equal to or less than the read top address scope, i.e., a following relationship is established:

queue_top≦scope

This third state is called as a reverse state. By distinguishing the second and third states from each other, it is possible to distinguish whether the queue 9 is empty or full in a state that the address scope_next is equal to the address queue_top_in. That is; change from the second state to the state of (scope_next=queue_top_in) represents the empty state of the queue 9. Further, change from the third state to the state of (scope_next=queue_top_in) represents the full state of the queue 9. These second and third states will be described in greater detail later.

Between the queue 9 and the instruction decoder 26, there is provided the L-latch circuits 14, 15 and 16 which are responsive to the clock signals L to hold contents of a plurality of entries read from the queue 9. The L-latch circuit 14 (will be called as an "IRL latch 14") holds a plurality of instructions inst simultaneously read from the queue 9.

The L-latch circuit 15 (will be called as a "PCL latch 15") holds addresses PC corresponding to the instructions simultaneously applied from the queue 9.

The L-latch circuit 16 (will be called as an "instruction avail L-latch 16") holds the availability flag inst_avail associated to the instructions read from the queue 9.

The instruction decoder 26 is responsive to the addresses, instructions and availability flags from the IRL latch 14, PCL latch 15 and instruction avail L-latch, respectively, to decode the applied instruction for detecting and issuing the instructions allowing parallel execution to the function units. The instructions simultaneously issued to the function units are determined in an ascending order of the addresses from the PCL latch 15, and an instruction having a smaller address is issued earlier than those having larger addresses if the instructions have mutual data dependency.

A fundamental movement of the instruction fetching scheme according to the invention will be described below.

Figure 9:
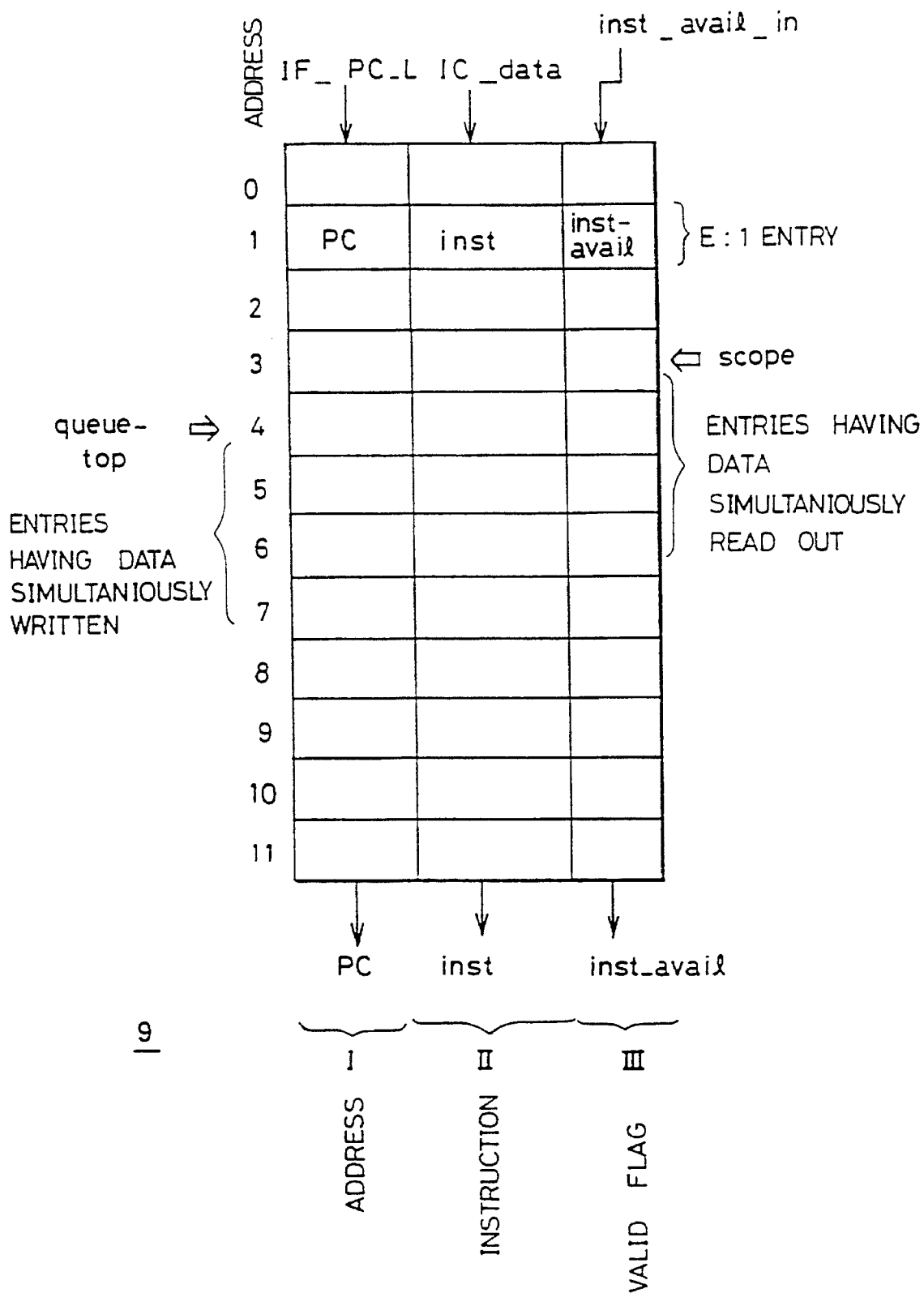
FIG. 9 shows a conceptional construction of a queue in FIG. 8.

FIG. 9 shows a conceptional construction of the queue 9. In FIG. 9, the queue 9 has memory regions bearing addresses 0–11, and one entry E is stores at each address. Each entry E includes a region I for storing an address (logic address) of the instruction fetched from the instruction memory, a region II for storing the instruction IC_data fetched from the instruction memory and a region III for storing the flag inst_avail which indicates whether the corresponding instruction is available. Four instructions each including the address IF_PC_L, instruction IC_data and flag inst_avail_in are transmitted in parallel to the queue 9 and are simultaneously stored in different four address regions. The register regions of the entries of the queue 9 are designated by the addresses queue_top, and they are stored in the regions of the addresses from queue_top to queue_top+3.

Reading of the instructions from the queue 9 is performed by parallel reading of the four instructions. Designation of the addresses for this reading is performed by the address scope, and the entries registered in the addresses from scope to scope+3 are simultaneously read in parallel. Now, a fundamental operation of the instruction fetch scheme according to the invention will be described with reference to FIG. 10.

A state (1) is the initial state (first state) immediately after the reset or initialization. In this initial state, both the addresses queue_top and scope indicate the initial address 0 of the queue 9. In the queue 9, the availability flags starting from queue_top, i.e., address 0 is set at OFF (0). In this state, since the availability flags indicate OFF (0), the four entries at the addresses 0–3 of the queue 9 are unavailable, and thus issue or execution is inhibited.

In a state (2), instructions are written in four addresses starting from the address 0 indicated by the address queue_top. Since these written instructions are available instructions, the availability flags corresponding to them are set at ON (1), which indicates that these written instructions are available and that reading, issuing and executing of the instructions of these four entries are allowed. In this state (2), queue_top is not yet changed. In this state (2), four entries starting from the address 0 indicated by the address scope are read, and are applied to the instruction decoder for decoding.

In the state (2), the instruction decoder issues two instructions, which are determined to allow parallel processing, to the function unit, and the read top address scope is changed to the address 2.

In the cycle of a state (3), the read top address queue_top has been changed to the address 4, and four address regions starting from this address 4 store the subsequent four instructions 4–7. Availability flags corresponding to these newly written instructions 4–7 are also set simultaneously to be ON.

A state (4) represents a state after the issue of one instruction. Since one instruction was issued, the read top address scope has moved one to indicate the address 3. Further, in this state (4), four new instructions 8–11 have been written in four address regions starting from the address 8 indicated by the write top address queue_top, and the corresponding availability flags are ON (1). In a cycle of this state, the instructions of four addresses starting from the address 3 indicated by the address scope are read from the queue 9 and are applied to the instruction decoder for decoding.

A state (5) represents a state in which no instruction was issued from the instruction decoder in the last cycle. Since the issued instruction count is 0, the write top address scope has not moved and indicates the address 3. In a cycle of this state (5), the instructions of four addresses starting from the address 3 indicated by the address scope are read from the queue 9 again and are decoded by the instruction decoder. In this state (5), owing to the queue_top+4 (12 module addition) performed in the last cycle, the write top address queue_top is 0 (8+4=0) and the address 0 is indicated. Since four address regions starting from the address queue_top (0) contains instructions which are not yet issued, i.e., instructions of the address 3, the queue 9 does not perform capturing of the instructions.

A state (6) represents a state in which three instructions were issued from the instruction decoder in the last cycle. Owing to the issue of the three instructions, the read top address scope is shifted by three, and the address 6 is indicated. Instructions 12, 13, 14 and 15 are stored in four address regions starting from the address 0 indicated by the write top address queue_top. Since the instructions 12–15 are available, the corresponding availability flags are in ON state. Determination of existence of an empty region in the queue 9 is performed by a signal queue_avail supplied from the queue avail logic 34.

A fundamental operation when branch is caused by a branch instruction will be described below with reference to FIG. 11 showing a flow thereof. It is assumed that the queue 9 is in a state (11), in which the address queue_top indicates the address 10 and the address scope indicates the address 2. In the state (11), instructions 8, 9, 10 and 11 are written in the addresses 10, 11, 0 and 1. Instructions 2, 3, 4 and 5 stored in the addresses 2, 3, 4 and 5 of the queue 9 are read and applied to the instruction decoder. In a cycle of this state (11), an instruction 2 of the address 4 is assumed to form a branch instruction by which the branch is caused. In a next state (2), an operation is performed as follows.

Since the branch is caused in the instructions 2, contents of addresses higher than the address 3 of the queue 9 is no longer required.

The availability flags of four entries stored in the addresses subsequent to the address queue_top, i.e., addresses 4–7 are set at OFF (0). The addresses queue_top and scope are set at the address 4 of the queue 9.

An address of an branch target instruction is sent to the instruction memory in this cycle, and then will be supplied from the instruction memory in the next cycle. That is; the branch target instruction is not written in the queue 9 in this cycle.

The instructions of four entries starting from the address scope can be decoded as an issue target. However, these contents should not be issued to the function units. In order to indicate this inhibition of issue, availability flags of four entries starting from the address queue_top are set at OFF (0) in this cycle.

In a state (13), branch target instructions 20–23 are supplied from the instruction memory to the regions of addresses 4–7 starting from the address queue_top and are written therein. These instructions 20–23 are branch target instructions and thus are to be decoded and issued so that the availability flags thereof are set at ON (1).

In this cycle, the instructions 20–23 of four entries starting from the address scope (queue address 4) are applied to the instruction decoder for decoding.

Then, description will be made with respect to a fundamental operation in a case that an instruction cannot be supplied from the instruction memory in spite of an instruction fetch request from the processor, with reference to FIG. 12 showing a flow thereof.

It is assumed that the queue 9 is in a state (21) shown in FIG. 12. In this state (21), instructions 8–11 are written in the addresses 0–3 of the queue 9, respectively. The instructions 2, 3, 4 and 5 stored in the addresses 6, 7, 8 and 9 of the queue 9 are applied to the instruction decoder 26 and is decoded as the issue target.

In this cycle, it is assumed that the instructions 2, 3 and 4 are issued to the function units.

It is also assumed that, in this cycle, an instruction fetch request is issued to the instruction memory but the instruction memory cannot supply the instruction in this cycle due to a certain cause (e.g., cache miss, if the instruction memory has a cache configuration).

In a state (22), since the instructions 2, 3 and 4 were issued in the last cycle, the address scope has shifted by three and the address scope is indicated.

The address queue_top indicates the address 4. Since an instruction is not supplied from the instruction memory, the instructions stored in the addresses 4, 5, 6 and 7 of the queue 9 are different from those to which the fetch request is applied and thus should not be decoded. Therefore, if an instruction is not supplied from the instructions memory, the availability flags of four entries stored in the addresses subsequent to the addresses queue_top are set at OFF (0).

In a state (23), an instruction is not yet supplied from the instruction memory, and the processor is in a state for waiting arrival of an instruction. Therefore, writing of instructions in the queue 9 is interrupted. Meanwhile, even if the instruction fetch is not performed, issue of instructions to the function units are continued through the instruction decoder 26 as long as an unissued instruction is in the queue 9. In an example shown in FIG. 12, two instructions were issued in the last cycle (state (22)) and the address scope indicates 11.

In a state (24), since instructions have arrived from the instruction memory, the instructions are written in four entries of the queue 9 starting from the address queue_top (address 4). That is; the instructions 12–15 are written in the addresses 4–7, respectively.

In the last cycle, two instructions (instructions 7 and 8) were issued, and the address scope indicates the address 1.

Then, description will be made with respect to logics 30–36 for achieving the operation shown in FIGS. 10–12. First, logic achieved by the queue top logic 30 will be described.

(1) Initial state: This state includes following two states.

(a) Reset state: signal_reset=1

In this state, queue_top=0

(b) Initialized state: signal queue_init_state_L=1

In this state, the write top address of the queue 9 is set at an address held by the queue top L-latch 17. Therefore, a following relationship is established.

queue_top_in=queue_top_L

Then an uninitialized state, i.e., a case of reset*init_state_L=0, will be described. The above "*" represents an AND operation.

(2) A branch generation state: signal br_taken=1

In this state, the address queue_top is set at an address in which a branch instruction is stored in the queue 9. Therefore, a following relationship is established.

queue_top_in=branch_inst_entry

The instruction decoder 26 can identify the address in the queue 9 of the applied instructions by receiving the read queue address queue_top through a path (not shown).

(3) A case that the instruction is not supplied in spite of the issued instruction fetch request: IC_fetch_L=1 and IC_ready=0

In this state, since the address queue_top maintains the same value as the last cycle, a following relationship is established.

queue_top_in=queue_top_L (4) In a case that instruction supply is performed in connection with the issued instruction fetch request and there is emptiness in the queue 9:

IC_fetch_L=1, IC_ready=1 and queue_avail=1

In this case, the address queue_top will be shifted by four in the next cycle, so that a following relationship is established:

queue_top_in=queue+4 wherein "+" is module addition of the module 12. Therefore, if (queue_top>11) {queue_top_in=queue_top_in_12}

(5) A case that, in spite of the fact that the instruction fetch request is issued and the instruction is supplied, there is no empty region (for four entries) in the queue:

IC_fetch_L=1, IC_ready=1 and queue_avail=0

This state represents a state in which the writing of the instruction is not performed because there is no region for writing the instructions for four entries in the queue 9. The address queue_top maintains the same state as the last cycle. Therefore, a following relationship is established.

queue_top_in=queue_top_L (6) A case of an instruction arrival waiting state:

This state includes following two cases.

(a) A case that the instruction supply is not performed due to a certain cause such as cache miss in spite of the fact that the instruction fetch request is issued:

IC_fetch_L=1 and IC_ready=0

In this state, queue_top of the last cycle is maintained, resulting in a following relationship:

queue_top_in=queue_top_L (b) A case that access, for example, to the instruction memory is impossible:

IC_miss_L=1 and IC_ready=0

In this state, since an instruction is not supplied, the address queue_top maintains the last value, resulting in a following relationship:

queue_top in=queue_top_L (7) A case that an instruction is applied in the instruction arrival waiting state due to, for example, cache miss, and an empty region exists in the queue 9:

IC_miss_L=1 IC_ready=1 and queue_avail=1

In this state, all the applied instructions can be written in the queue 9. In this cycle of this state: a following relationship is established:

queue_top_in=queue_top_L+4 wherein "+" represents module addition of the module 12.

(8) A case that there is no empty region in the queue 9 in spite of the fact that the instruction is supplied in the instruction arrival waiting state:

IC_miss_L=1, IC_ready=1 and queue_avail=0

In this state, since the instruction cannot be written in the queue 9, the address queue_top maintains a value of the last cycle. Therefore, a following relationship is established:

queue_top_in=queue_top_L (9) A case that the instruction fetch request is not generated, and it is not in an instruction arrival waiting state:

IC_fetch_L=0 and IC_miss_L=0

This state is a state in which execution of instructions of the instruction memory is interrupted due to, for example, interruption processing. In this state, the address maintains the value of the last cycle. Therefore, a following relationship is established:

queue_top_in=queue_top_L

The logic described above is shown in a list in FIG. 13.

The logic executed by this queue top logic 30 will be apparent from the above description. The queue_top logic 30 may employ any specific construction, if it satisfies the logic table shown in FIG. 13. For example, as a simple form, logics indicated by respective rows (in a lateral direction) in the table shown in FIG. 13 may be formed by AND gates and the circuit structures taking logical OR in each row may be employed for completing the logic 30.

A logic operation for executing the scope next logic will be described below.

(1) A reset state:

signal reset=1

In this state, the address scope is set at 0. That is:

scope_next=0

(2) Generation of a branch instruction:

br_taken=1

In this case, as shown in FIG. 11, the address scope is set at an address of the queue 9 in which the branch instruction is stored. Therefore, a following relationship is established:

scope_next=branch_inst_entry (3) A state other than those described above:

reset=1 and br_taken=0

In this state, the address scope is shifted in accordance with the issued instruction count. That is; a following relationship is established:

scope_next=scope_L+issued_inst_count wherein "+" is module addition of the module 12. Therefore:

if, scope>11=1, then, scope_next=scope_next_12

Logic achieved by the scope next logic 31 is shown as a list in FIG. 14.

In FIG. 14, flags scope>11 and queue_top>11 represent that the addresses scope and queue_top have made one circulation in the queue 9.

Referring to FIG. 15, a logic for achieving the instruction fetch logic 32 will be described below.

(1) A case that the instruction fetch request is generated in an unreset state or in a state that the instruction memory can accept the instruction fetch request. That is:

if, reset!=1 and IC_busy!=1, then, IC_fetch=1 wherein "!" is a sign indicating negation.

(2) A case that the instruction fetch request is not issued in the reset state or in a state that the instruction memory does not accept the instruction fetch request, as described above. Therefore, in all states except for the above state (1), a following relationship is established:

IC_fetch=0

Then, a logic achieved by the instruction miss logic will be described with reference to FIG. 16.

The signal IC_miss is a flag indicating a state for waiting arrival of an instruction from the instruction memory. This instruction miss logic 33 determines following states of the flag IC_miss of the cycle.

(1) Reset state: reset=1

In this state, any instruction is not yet generated, and thus it is not necessary to wait an instruction, so that the flag IC_miss is 0.

(2) A case that a branch instruction is generated during the operation: br_taken=1

In this state, a branch target instruction is fetched in the next cycle, so that the instruction waiting state is not established, and the flag IC_miss becomes 0.

(3) A case that the instruction memory does not supply an instruction in spite of the issue of the instruction fetch request:

IC__fetch__L=1 and IC-ready=0

In this state, the next cycle will be the instruction supply waiting state, and it will be necessary to write an instruction if supplied in the next cycle. The flag IC__miss becomes 1.

(4) A case that the instruction memory supplies the instruction:

IC__ready=1

This state represents that the instruction memory supplies the instruction, and thus the next cycle is not required to be in the instruction waiting state, so that the flag IC__miss becomes 0.

(5) A state that, in the operating condition, neither the branch instruction nor the instruction fetch request is generated, and further the instruction memory does not supply the instruction supply indication:

br__taken=0, IC__fetch__L=0 and IC__ready=0

In this state, execution is interrupt due to, for example, an interrupting processing, and the flag IC__miss is required to hold a value at the last cycle.

Therefore, a following relationship is established.

IC__miss=IC__miss__L

Then, referring to FIGS. 17A and 17B, a logic operation achieved by the queue avail logic 34 will be described. In this operation, the signal queue__avail is applied as a write enable signal wen to the queue 9.

(1) A reset state:

reset=1

In this state, since the queue 9 stores no instruction, four instructions can be write in four address regions continuing from the address queue_top in the queue 9. Therefore, a following relationship is established.

queue__avail=1

(2) A case of generation of the branch instruction:

br__taken=1

In this state, as shown in FIG. 11, since it is necessary to write branch target instructions in the addresses starting from queue_top, empty regions equivalently exist. Therefore, a following relationship is established:

queue__avail=1

If a queue full logic (will be described later) has indicated that empty regions (for four entries) exist in the queue 9 in a state in which the branch is not generated, a following relationship is established:

queue__avail=1

If the queue full logic has indicated that the queue 9 is not in the empty state (i.e., has no empty region for entries for writing four instructions), a following relationship is established:

queue__avail=0

That is: a following relationship is established in this state:

queue__avail=!queue__full

Then, the queue full logic will be described. This queue full logic is included in the queue avail logic 34 in FIG. 8. L logic achieved by the queue full logic will be described with reference to FIG. 17B.

(1) This queue full logic determines whether the queue 9 has an empty region in accordance with the address scope from the scope next logic 31 and the address queue__top__in from the queue top logic 30. The address scope supplied form the scope next logic 31 indicates the read top address in the next cycle, and thus is deemed as scope__next in the following description.

Figure 17C:
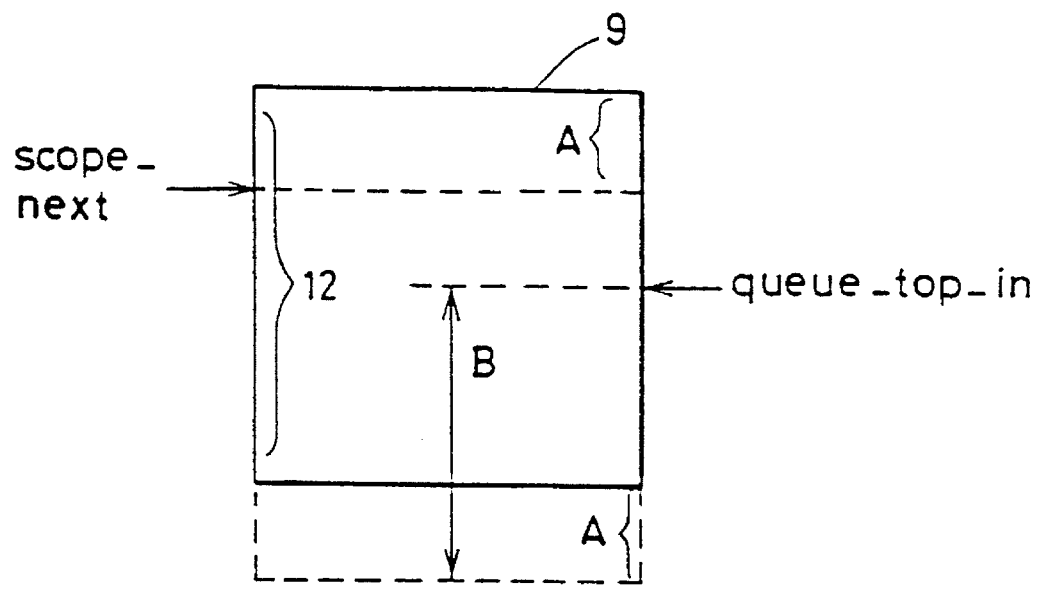
FIGS. 17C and 17D shows a logic operation of queue full shown in FIG. 17B.

(1) A case that the read top address scope__next in the next cycle is smaller than the write top address queue__top__in the next cycle:

As shown in FIG. 17C, the instructions are written in the addresses starting from queue__top__in. Therefore, if there is a difference (B) of 4 or more between on one hand a sum of the whole entry number (12) of the queue 9 and the address scope__next and on the other hand the address queue__top__in, the instruction can be written in the next cycle. Therefore, if, scope__next+12__queue__top__in≧4, then, queue__full=FALSE (0: an empty region exists) otherwise, queue__full=TRUE (1: no empty region)

Figure 17D:
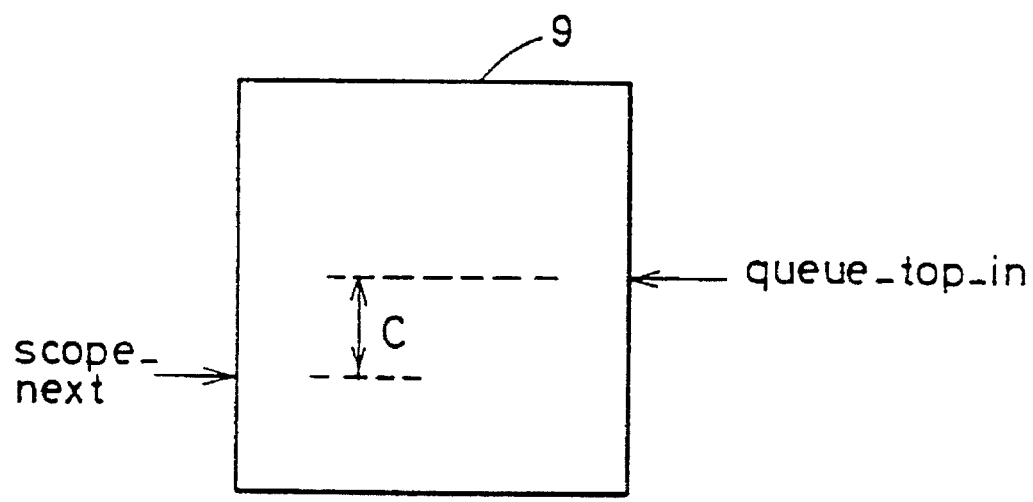

(2) scope__next>queue__top__in:

This state is shown in FIG. 17D. If there is a difference of 4 or more between scope__next and queue__top__in, the instruction can be written in the queue 9. Therefore, if, scope__next_queue__top__in≧4, then, queue__full=FALSE If, scope__next_queue__top__in<4, then, queue__full=TRUE (3) scope__next=queue__top__in This state is a state in which the read top address and the write top address in the next cycle are equal to each other. In this case, existence of the empty region in the queue 9 is determined in accordance with the queue state (queue__state) described below. That is;

if, queue__state=NORMAL, then, queue__full=FALSE

If, queue__state!=NORMAL then, queue__full=TRUE

The signal queue__state for determining the existence of the empty region in the queue 9 will be described below. Here, the empty regions (S) represents regions, in which all the instructions fetched from the instruction memory can be written at the same time, and represents regions of four entries in this embodiment. The queue 9 may take the first state as well as the second and third states. The second state (NORMAL state) will be described with reference to FIGS. 18A and 18B.

FIGS. 18A and 18B show a position relationship of the addresses queue__top and scope of the queue 9 which is in the second state (NORMAL state). In FIG. 18A, the address queue__top represents the address 6 of the queue 9 and the address scope represents the address 2 of the queue 9. This state can be expressed as follows:

scope<9__top

FIG. 18B shows a state in which an instruction is not supplied in the state in FIG. 18A and only an instruction is issued. In this case, the addresses scope__next and queue__top__in will be equal to each other in the next cycle. This state is formed in the second state (NORMAL state) and is also called as the second state. This state can be expressed as follows:

scope__next=queue__top__in

Therefore, conditions required for setting the queue 9 in the second state (NORMAL state) can be expressed as follows:

scope≦queue__top

Then, referring to FIGS. 19A and 19B, the third state (REVERSE state) of the queue 9 will be described.

FIGS. 19A and 19B show a position relationship of the addresses scope and queue__top in the third state (REVERSE state) of the queue 9. In FIG. 19A, the address scope represents the address 6 of the queue 9, and the address queue__top represent the address 2 of the queue 9. This state can be expressed as follows:

scope>queue__top

It is assumed that an instruction is not issued but an instruction is supplied in this state. In other words, it is assumed that an instruction is supplied from the address 2 of the queue 9 in FIG. 19A. In this case, as shown in FIG. 19B, the addresses in the next cycle has a following relationship:

scope_next=queue_top_in

In this state, the queue 9 is filled only with unissued instructions. In this state, it is necessary to inhibit writing of instructions in the next cycle. The third state (REVERSE state) also includes this state. Therefore, conditions for the third state (REVERSE state) can be expressed as follows:

scope≧queue_top

By monitoring the state of the queue 9 through the signal queue_state, existence of an empty region in the queue 9 can be determined through the logic operation of the logic queue_full described before.

The logic operation achieved by this queue state logic 50 is shown in a list in FIG. 20. An operation of the queue state logic 50 will be described.

(1) In an initial state after resetting, the addresses queue_top and scope are set at the address 0 of the queue 9. Although this state is the first state of the queue 9, the signal queue_state is set at the second state because the instruction can be written in the queue 9. That is:

if, reset=1 then, queue_state=NORMAL (2) A case after one circulation of the address queue_top in the address regions in the queue 9 and before one circulation of the address scope in the address regions in the queue 9:

In this state, as indicated at (2) in FIG. 20, the queue 9 is in the third state (REVERSE state). Therefore, if, queue_top>11==1 and scope>11==0 then, queue_state=REVERSE (3) A case that the address scope has made one circulation in the address regions in the queue 9:

In this state, since the address scope_next never exceeds the address queue_top_in, the queue 9 is in the second state (NORMAL state). Therefore, if, scope>11==1 then, queue_state=NORMAL (4) A case of generation of a branch:

In this state, address regions in the queue 9 starting from the branch instruction are required to accommodate the next branch target instruction. Therefore, in this state, the addresses scope_next and queue_top_in become equal to each other, but the state of the queue 9 is set at the second state (NORMAL state) for enabling the writing of the instruction. Therefore, if, br_taken=1 then, queue_state=normal Then, logic achieved by the instruction avail logic 35 which determines a flag written in an "availability flag" portion in the queue 9 will be described with reference to FIG. 21.

FIG. 21 is a list showing logic achieved by the instruction avail logic 35.

(1) Initial state: reset=1

In this state, any available instruction is not yet stored in the queue 9, and thus the availability flag is OFF (0). Therefore, if, reset=1 then, inst_avail_in=0

(2) A case of generation of a branch:

In this state, it is necessary to inhibit issuing of instructions of four entries continuing from the address at which the branch instruction is stored. Therefore, the availability flag is OFF (0) in this case. Therefore, if, br_taken=1 then, inst_avail_in=0

(3) A case that the instruction fetch request is issued:

In this state, availability and unavailability of instructions starting from the queue_top depends on whether the instruction memory supplies the instructions. Therefore, if, IC_fetch_L=0 then, inst_avail_in=IC_ready (4) A case of the instruction arrival waiting state:

This state is generated independently of existence of the instruction fetch request in the current cycle. Also in this case, the availability and unavailability of instructions starting from the queue_top depends on whether the instruction memory supplies the instructions. Therefore, if, IC_miss_L=0 then, inst_avail_in=IC_ready (5) A case other than the above described four states:

In this state, instructions written in the entries starting from the address queue_top are not requested instructions, so that the availability flag is OFF. Therefore, else, inst_avail_in=0

Figures 22, 24:
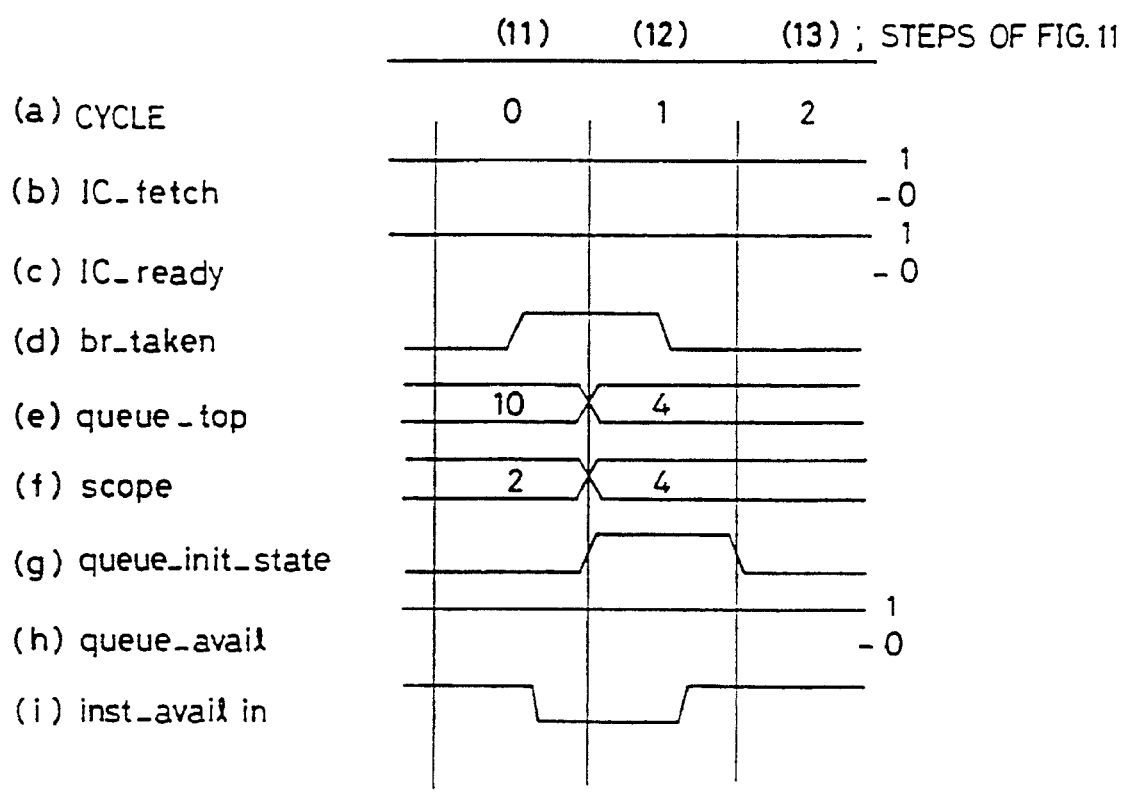
FIG. 22 is a list showing logic for achieving queue initialized state logic shown in FIG. 8.
FIG. 24 is a signal waveform diagram showing operations of respective logics of a queue shown in FIG. 8 at a time of generation of branch.

FIG. 22 shows a list of logic achieved by the queue initialization logic 36. A logic operation of the queue initialization logic 36 will be described hereinafter with reference to FIG. 22. Here, the initial state (first state) of the queue represents any state among the reset state of the queue, the state at which the branch instruction is generated and the instruction waiting state. That is; a state in which the instruction required in the queue 9 is not written is represented.

(1) A reset state:

In this state, any instruction is not yet written in the queue 9. Therefore, the queue 9 is in the initial state. Accordingly, if, reset=1 then, queue_init_state=1

(2) A state at which the branch is generated:

It is necessary to store the branch target instruction in the queue 9. However, this instruction is not written in the queue 9. Therefore, the queue 9 is in the initial state (first state). Therefore, if, br_taken=1 then, queue_init_state=1

(3) A case that an instruction is not supplied from the instruction memory in spite of the fact that the instruction fetch request is already issued:

Since the queue 9 in the instruction waiting state, the queue 9 is in the initial state (first state). Therefore, if, IC_fetch_L=1 and IC_ready=0 then, queue_init_state=1

(4) A case that an instruction fetch request is issued and an instruction is supplied from the instruction memory:

Since the instruction which is desired and required is written in the queue 9, the queue 9 is not in the initial state (first state). Therefore, if, IC_fetch_L=1 and IC_ready=1 then, queue_init_state=0

(5) A case that the queue 9 is in the instruction waiting state and the instruction memory does not supply the instruction:

In this state, the queue 9 waits arrival of the fetch-requested instruction. Thus, the queue 9 is in the initial state (first state). Therefore, if, IC_miss_L=1 and IC_ready=0 then, queue_init_state=1

(6) A case that the queue 9 is in the instruction waiting state and the instruction memory supplies the instruction:

In this state, the fetch-requested instruction is written in the queue 9, so that the queue 9 is no longer in the initial state (first state). Therefore, if, IC_miss_L=1 and IC_ready=1 then, queue_init_state=0

(7) A case other than the reset state, branch generating state, state in which the instruction fetch request is performed and instruction waiting state:

In this state, without depending on whether an instruction is supplied or not from the instruction memory to the queue, the queue 9 is required to maintain the current state in the next cycle. That is; as shown in FIG. 13, the address queue_top should continuous to indicate the same address. Therefore, if, reset=0 and br_taken=0, and IC_fetch_L=0 and IC_miss_L=0 then, queue_init_state=queue_init_state_L Although the logic achieved by the logics 30–36 and 50 has been described with reference to the list, specific constructions for achieving these logics may be facilely formed by those skilled in the art, for example, using programmable logic devices.

The instruction decoder 26 decodes the address ID_PC_L, instruction ID_IR_L and availability flag ID_inst_avail_L supplied from the L-latch circuits 14–16 to detect and transmit the instructions allowing parallel processing to the corresponding function units, and also generates the signal br_taken, data issued_init_count and address branch_init_entry. The instruction decoder may have any specific construction if it can achieve these functions.

A circuit construction shown in FIG. 8 executes all the desired operations in one cycle. When the branch is generated and the branch instruction is applied to the instruction decoder 26 together with other instructions, instructions which is included in the above other instructions and applied after the branch instruction may be processed so that they are decoded but not issued to the function units, and also may be processed so that they are applied to the function units, but the operation of the function units in the same cycle is inhibited. Now, operations of the respective logics 30–36 and 50 will be described with reference to Figures.

Figure 23:
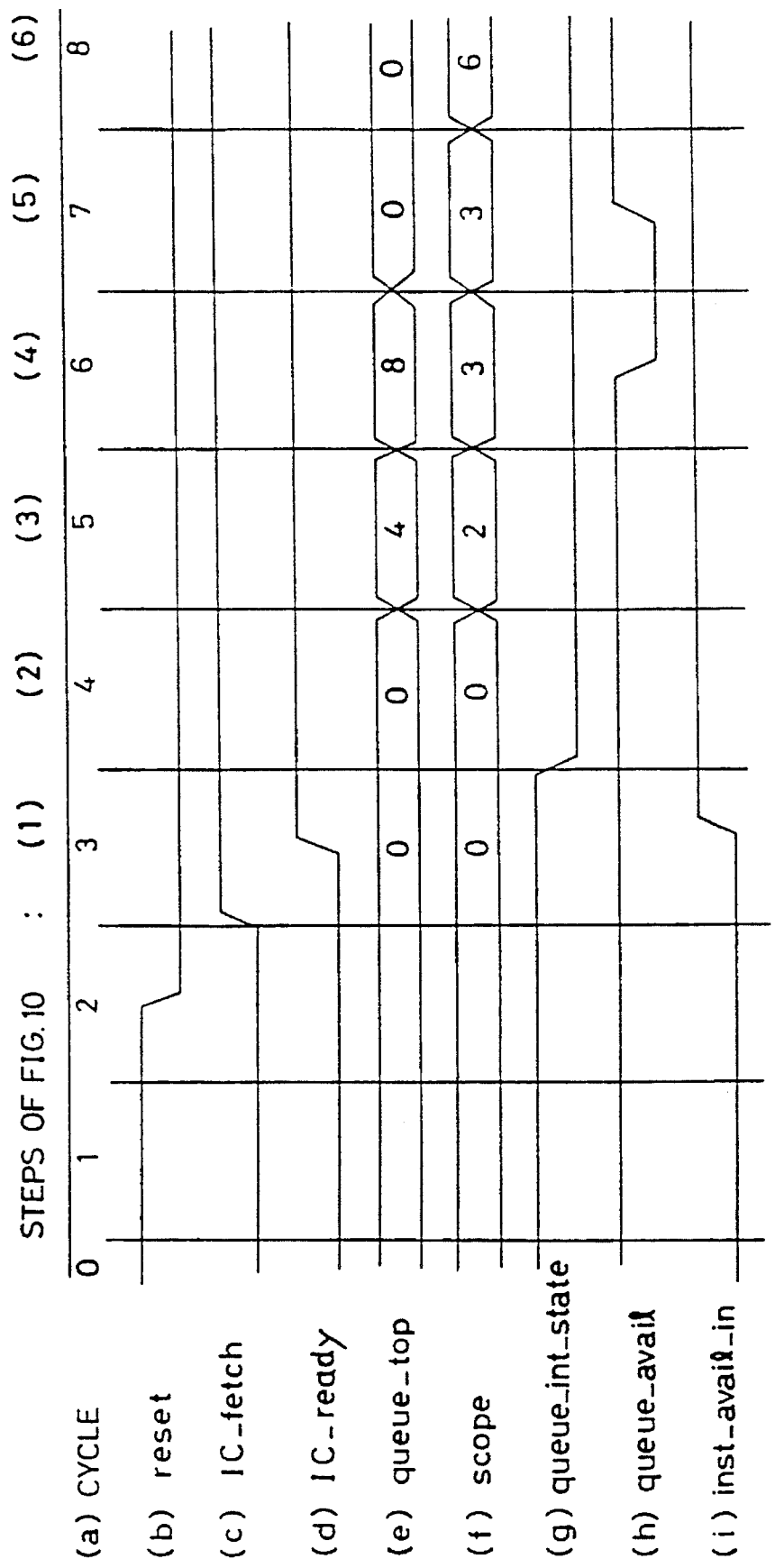
FIG. 23 is a signal waveform diagram showing operations of respective logics in a basic movement of a queue shown in FIG. 8.

FIG. 23 is a signal waveform diagram showing the operation of each logic corresponding to the fundamental movement of the queue, queue_top and scope shown in FIG. 10. FIG. 23 also shows correlation between the respective cycles and the respective steps shown in FIG. 10. Start of each cycle is determined by the clock signal T. In this signal waveform diagram, outputs of the logics at a middle of the cycle change in response to the clock signals L.

(1) Cycles 0 and 1:

In these cycles, the reset signal reset is "1", and the queue 9 is in the initial state. Therefore, the signal queue_init_state is ON (1), the addresses queue_top and scope are 0 and the availability flag inst_avail_in is 0.

In the reset state, the fetch request for the instruction memory is not performed, so that the instruction fetch request flag IC_fetch is OFF (0). Since there are sufficient empty regions in the queue 9 in the reset state, the signal queue_avail is "1", which indicates existence of the empty regions.

(2) A cycle 2:

In this cycle 2, the reset signal reset is "0" and the reset is released. The release of the reset is performed at a middle of the cycle, and the output states of the respective logics are identical to those in the cycle 1.

(3) A cycle 3:

In this cycle, the instruction fetch request IC_fetch from the instruction fetch logic 32 is set at the ON state. Thereby, the instruction fetch request is issued to the instruction memory. The instruction memory supplies the instruction for the instruction fetch request thus issued. The signal IC_ready indicating the supply of the instruction from the instruction memory is set at the ON state. In response to the signal IC_ready at the ON state, the availability flag inst_avail_in supplied from the instruction avail logic 35 is set at the ON state. At this time, the queue initial state flag queue_init_state is in the ON state, which indicates that the queue 9 is in the initial state.

(4) A cycle 4:

Owing to the ON state of the signals IC-fetch and IC-ready, the initial state of the queue 9 is released, the signal queue_init_state is set at OFF (0) and writing of the instructions or others in the queue 9 is executed. That is; the instruction IC-data for four instructions simultaneously supplied from the instruction memory, the logic address IF_PC_L of the respective instructions transmitted from the instruction fetching stage and the availability flag portion inst_avail_in from the instruction avail logic 35 are written in the regions of four address regions from the address 0 indicated by the address queue_top.

Also in this time, the instruction written in the addresses 0 starting from the address scope as well as the address and the availability flag are read and applied to the latch circuits 14–16, respectively. The data applied to the latch circuit 14–16 are applied to the instruction decoder 26 in response to the clock signal L and is decoded thereby. As a result, in the cycle 4, two instructions are issued to the corresponding function blocks as the instructions allowing parallel processing. Thereby, the instruction decoder 26 issues the signal issued_init_count, indicating the fact that the issued instruction count is 2, which is applied to the scope next logic 31. The scope_next becomes 2. Further, 4 is added to the address queue_top, and it becomes 4.

(5) A cycle 5:

In this cycle, the address queue_top indicates the address 4, and the address scope indicates the address 2. Similarly to the cycle 4, the instruction memory supplies the instructions which are written in the addresses 4–7. Simultaneously, the instructions are read from the address 2 in the queue 9 and are supplied to the instruction decoder 26 through the latch circuits 14–16. One instruction is issued from the instruction decoder 26 to the function unit. Therefore, the address scope supplied from the scope next logic 31 becomes 3. The address queue_top_in supplied from the queue top logic 30 becomes 8.

(6) A cycle 6:

Also in this cycle 6, the instruction memory supplies the instructions similarly to the cycle 4. Thereby, the instructions are written in the addresses 8–11 of the queue 9.

Meanwhile, since there is no instruction which is issued from the instruction decoder 26 to the function unit, the signal issued_inst_count, which indicates that the issued instruction count is 0, is generated and applied to the scope next logic 31.

The address queue_top_in for the next cycle from the queue top logic 30 indicates the address 0. The address scope_next supplied from the scope next logic 31 is 3. In this time, an unissued instruction remains at the address 3 in the queue 9. Therefore, the queue avail logic 34 sets the signal queue_avail at OFF (0) in order to indicate that there is no empty region in the queue 9 by the function of the queue full logic contained therein. Thereby, writing of the instruction in the queue 9 is inhibited in the next cycle. The signal queue_avail is applied as a write enable signal wen for the queue 9.

(7) A cycle 7:

In this cycle, the instruction is read from the address 3 of the queue 9 and three instructions are issued from the instruction decoder 26. Thereby, the address scope_next supplied from the scope next logic 31 becomes 6. The address queue_top_in remains to be 0 because the signal queue_avail is currently in the OFF state. In this time, the address scope_next is 6, and on the other hand, the address queue_top_in is 0, and an empty region is formed in the queue 9, so that the output signal queue_avail from the queue avail logic 34 becomes ON and the writing of the instruction in the queue 9 is allowed in the next cycle.

(8) A cycle 8:

Although the address queue_top is 0 similarly to the cycle 7, the instruction can be written in the queue 9 (queue_avail or wen is in the ON state), so that the instructions are written in the regions of the addresses 0–3 in the queue 9. In this time, the address scope is 6, the queue 9 indicates the address 6, and the instruction from the address 6 of the queue 9 is applied to the instruction decoder 26.

Since the instruction fetch requests IC_fetch are continuously issued, contents of the instructions applied from the instruction memory in the cycles 7 and 8 may be different from each other. However, the same instruction may be applied from the instruction memory by such a construction that the signal queue_avail from the queue avail logic 34 is applied to the instruction fetching stage, and the count operation of a program counter (IF_PC) included in the instruction fetching stage is inhibited if the signal queue_avail is OFF, so that the same contents of the instruction memory are applied in the cycle 7 and the cycle 8.

It should be noted that the respective logics 30–36 and 50 perform only logical processing of the applied signals and do not perform synchronous operations with the clock signals T or L.

FIG. 24 is a signal waveform diagram showing operations of the respective logics when the branch shown in FIG. 11 is generated. In FIG. 24, the steps in FIG. 11 are shown in connection with the respective cycles. Movement of the queue, queue_top and scope at the time of generation of the branch will be described below with reference to FIG. 24.

(1) A cycle 0: The address_top is 10 and the address scope is 2. Therefore, from the queue 9, the instructions 8, 9, 10 and 11 are written in the addresses 10, 11, 0 and 1. On the other hand, the instructions 0–3 in the addresses 2–5 of the queue 9 are read. In this cycle 0, it is assumed that the branch is generated owing to the branch instruction stored in the address 4 of the queue 9. In this case, the signal br_taken becomes ON (1). By this branch, the availability flag inst_avail_in from the instruction avail logic 35 becomes OFF (0).

Owing to the generation of the branch, the address queue_top_in supplied from the queue top logic 30 becomes 4 in accordance with the address branch_inst_entry at which the branch instruction 2 was stored. Similarly, the address scope_next supplied from the scope next logic 31 becomes 4.

The output queue_init_state of the queue initialization logic 36 is changed to 1 by the generation of the branch so as to indicate the initial state (first state). To the queue avail logic 34, a signal indicating the NORMAL state is applied from the queue state logic 50 by the generation of the branch.

(2) A cycle 1:

In this cycle, both the addresses queue_top and scope are set at 4, and "0" is written in the availability flags of the addresses 4–7 of the queue 9. Upon generation of the branch, the address of the branch target instruction is applied from the instruction fetching stage to the instruction memory in this cycle, and the branch target instruction is supplied from the instruction memory in the next cycle. Therefore, the branch target instruction is not written in the queue 9 in this cycle.

In this cycle 1, although the instructions starting from the addresses 4 are applied to the instruction decoder 26, the instruction contents should not be issued to and executed by the instruction units. Therefore, the instruction decoder 26 does not issue the same because the related availability flags inst_avail are set in the OFF state.

Further, the output signal queue_init_state from the queue initialization logic 30 is OFF (10), so that 4 is held in the addresses queue_top_in and scope_next supplied from the queue top logic 30 and the scope next logic 31, respectively. Since the branch is not generated in this cycle, the signal br_taken from the instruction decoder 26 is OFF. Thereby, the availability flag inst avail in from the instruction avail logic 35 is ON.

(3) A cycle 2:

In this cycle, the branch target instructions are supplied and stored in the queue 9, and related availability flags inst_avail_in are also set at ON. In this time, instructions starting from the address 4, i.e., the branch target instructions are applied to the instruction decoder 26 for decoding. In this cycle, the signal queue_init_state is OFF, so that the addresses queue_top and scope are respectively changed in accordance with the processing contents (issued instruction count). In the cycle 2, the signal IC_ready is ON, which indicates that the branch target instruction is supplied in the cycle 2.

Figure 25:
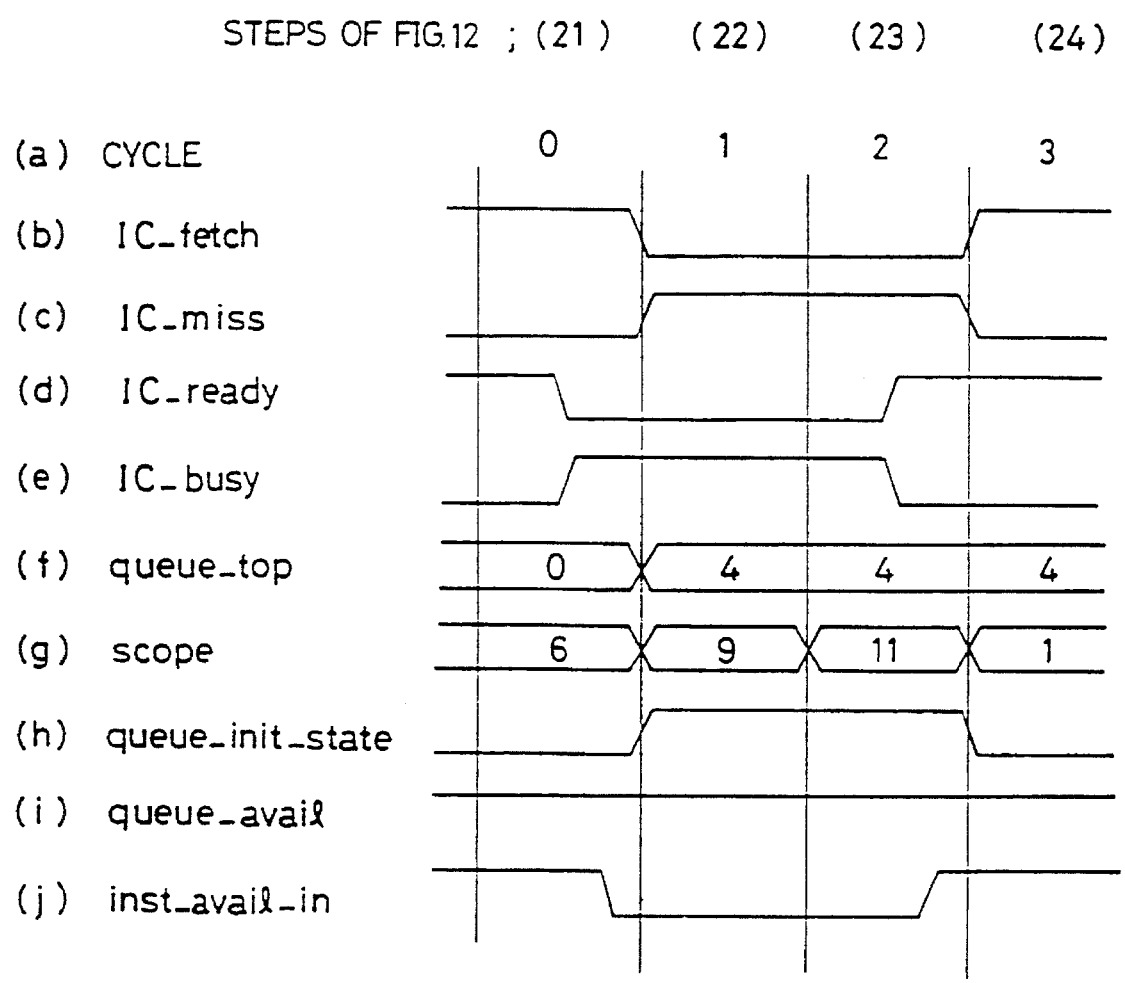
FIG. 25 is a signal waveform diagram showing operations of respective logics shown in FIG. 8 in a case that instruction supply is not performed with respect to an instruction fetch request.

FIG. 25 is a signal waveform diagram showing operations of respective logics in the operating condition shown in FIG. 12. Now, referring to FIG. 25, description will be made with respect to an operation when the instruction memory does not supply the instruction corresponding to the issued instruction fetch request. FIG. 25 also shows the steps shown in FIG. 12 in connection with the respective cycles.

(1) A cycle 0:

In this cycle, the address queue_top is 0 and the address scope is 6. It is assumed that the instruction memory does not supply the instruction with respect to the instruction fetch request issued in this cycle 0 (IC_fetch is ON). In this time, the signal IC_ready from the instruction memory is OFF, and the signal IC_busy is set at ON in order to inhibit access to the instruction memory. In response to the OFF state of the signal IC_ready, the availability flag inst_avail_in changes from the OFF state to the ON state.

(2) A cycle 1:

In this cycle, owing to the fact that, in the cycle 0, the signal IC-fetch was 1 and the signal IC_ready was 0, the signal IC_miss is 1, indicating the instruction waiting state of the queue 9. The output queue_init_state from the queue initialization logic 36 is set at "1" in response to the fact that the instruction is not issued in spite of the issue of the instruction request in the cycle 0, and the queue 9 is set at the initial state (first state, and also instruction waiting state), so that change of the address queue_top is inhibited. In this cycle, the availability flags inst_avail_in of OFF (0) are written in regions in the queue 9 starting from the address 4, inhibiting issue and execution of the instructions stored in these regions.

Meanwhile, the instruction from the address of the queue 9 indicated by the address scope is applied to the instruction decoder 26. Thereby, two instructions are issued, and thus the address scope_next in the next cycle is changed to 11.

(3) A cycle 2:

This state also holds a waiting state, in which the signal IC_fetch is OFF, the signal IC_miss is ON and the signal queue_init_state is ON. In this state, flags inst_avail_in indicating that instructions are unavailable are written in four entry regions starting from the address 4.

Meanwhile, instructions starting from the address scope are read and applied to the instruction decoder 26, whereby two instructions are issued, and thus the write top address scope_next in the next cycle is changed to 1.

In this cycle 2, it is assumed that the instruction memory supplies an instruction. In this time, the signal IC_ready becomes ON and the signal IC-busy becomes OFF. In response thereto, the availability flag inst_avail_in changes to the ON state, by which the queue 9 is released from the instruction waiting state.

(4) A cycle 3:

In this cycle, instructions supplied from the instruction memory are registered in regions in the queue 9 starting from the address 4 indicated by the address queue_top, and the corresponding availability flags inst_avail_in are set at 1. In this time, with respect to the instructions from the address positions indicated by the address scope, issue to the function units is performed by the instruction decoder 26. In this cycle 3, since the queue 9 is released from the instruction state, the initialized state signal queue_init_state is set at OFF, and change of the address queue_top restarts. The signal IC_fetch is also set at ON, and the instruction fetch request restarts.

As described above, there is provided the queue which can perform the simultaneous writing and simultaneous reading of a plurality of instructions together with their addresses and availability flags, and control of the write/read pointers of the queue and allowance of issue of the instructions to the function units are determined by an actual state among the branch generation, instruction supplying state and first state of the reset state, and also in accordance with the fact whether there is an empty region in the queue 9. Therefore, instructions can be efficiently supplied to the instruction decoder, and it is possible to provide a superscalar capable of executing the instructions at a high-speed. Then, description will be made with respect to a construction and operation of the queue 9 capable of simultaneously writing and reading the instructions.

Figure 26:
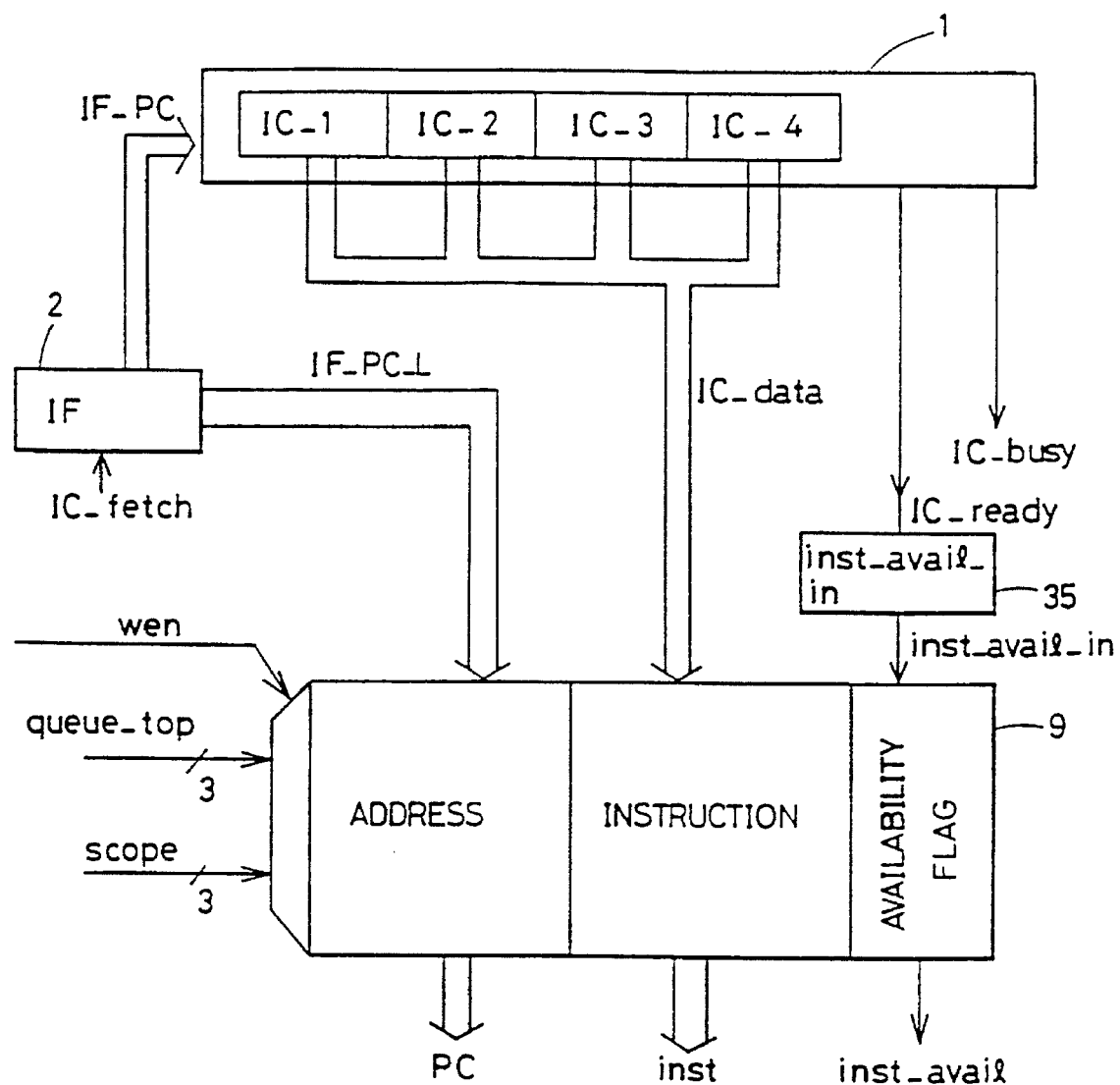
FIG. 26 shows a conceptional correlation between instructions, addresses and availability flags applied to a queue from an instruction memory.

FIG. 26 schematically shows a correlation between instructions fetched from the instruction memory 1 and instructions written in the queue 9. First, referring to FIG. 26, description will be made with respect to a writing operation in the queue 9 of the address IF_PC_L, instruction IC_data and availability flag inst_avail_in.

In response to the instruction fetch request IC_fetch, the instruction fetching stage 2 issues the address IF_PC of the instruction memory 1, which is applied to the instruction memory 1. In accordance with the address IF_PC, four instructions IC_1, IC_2, IC_3 and IC_4 are simultaneously read from the instruction memory 1. These four instructions IC_1–IC_4 are supplied in parallel as an instruction IC_data to an instruction region in the queue 9.

From the instruction fetching stage 2, this address IF_PC_L (address IF_PC issued in accordance with the clock L) is supplied to the queue 9. This address IF_PC_L indicates respective addresses of the four instructions IC_1–IC_4, and these address are applied in parallel to the address region of the queue 9. These instruction may have arbitrary lengths. However, for efficiently utilizing the entries of the queue 9, all the instructions from the instruction memory 1 are set to have the same length. A superscalar generally comprises a fixed instruction length format.

The signal IC_busy issued from the instruction memory 1 is applied to the instruction fetch logic 32 shown in FIG. 8. The signal IC_ready issued from the instruction memory 1 is applied to the instruction avail logic 35. Signals applied from another logics to this instruction avail logic 35 are not shown in the Figure.

The queue 9 receives the address IF_PC_L, instruction IC_data and availability flag inst_avail_in, and writes them simultaneously in four entry regions starting from the address indicated by the address queue_top in response to the write enable signal wen, which corresponds to the signal queue_avail issued from the queue avail logic in FIG. 8.

Further in, this time, contents in four entries starting from the address scope are read. The address IF_PC_L is defined in response to the clock signal L. However, it may be issued and defined in response to the clock signal T.

The instruction and address written in the queue 9 may be simultaneously read. The instruction and address read from the queue 9 are held in the latch circuits 14 and 15 which perform hold operation in response to the clock signal L, so that the write data of the queue 9 is required to be defined only before the hold operation of the latch circuits 14 and 15. Therefore, when the address IF_PC_L is simultaneously read again, the latch timings of the latch circuits may be delayed slightly, which prevents any malfunction even if the address IF_PC_L are defined in response to the clock signal L.

FIG. 27 shows a layout of the instruction IC_data supplied to the instruction region in the queue 9. Referring to FIG. 27, the four instructions to be simultaneously read are gathered in accordance with respective bits. That is; 0th bit regions of the instruction IC_data have stored 0th bits IC_10–IC_40 of the four instructions IC_1–IC_4 in sequence, and the others are also disposed in the subsequent regions up to 32nd regions in the similar manner. There is shown an example in which the instructions IC–1–IC–4 each have the 32 bit structure.

FIG. 28 shows a layout of the instruction address IF_PC_L transmitted to the address region in the queue 9, and specifically shows a layout in which the regions for the respective instructions are arranged in accordance with the order of bits similarly to the instruction IC-data.

FIG. 29 shows a layout of the availability flag. This availability flag has a four bit construction corresponding to the 4 entries and also has the equal value.

Figure 30A:
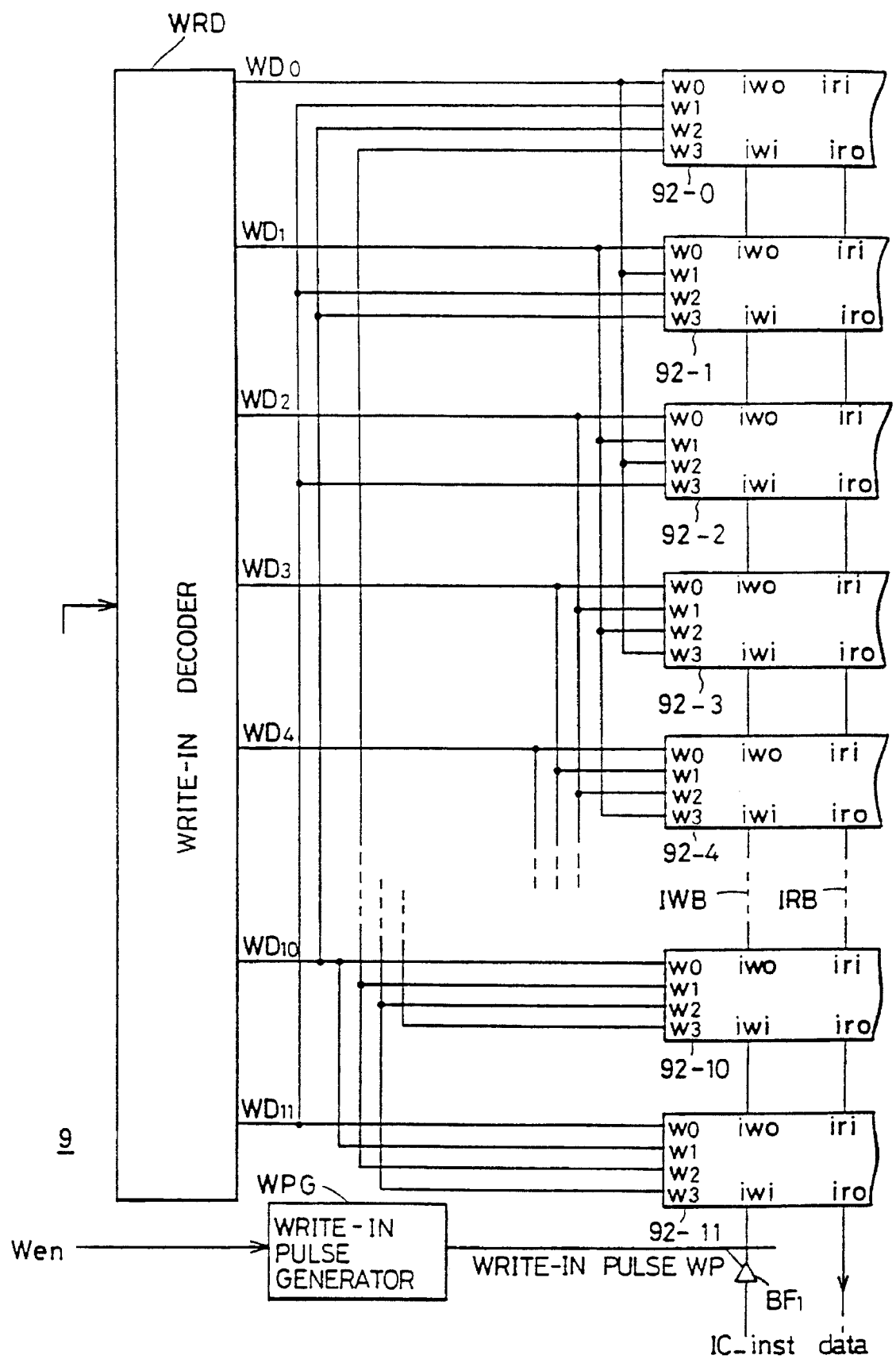
FIGS. 30(A) and (B) show an entire construction of a queue.
Figure 30B:
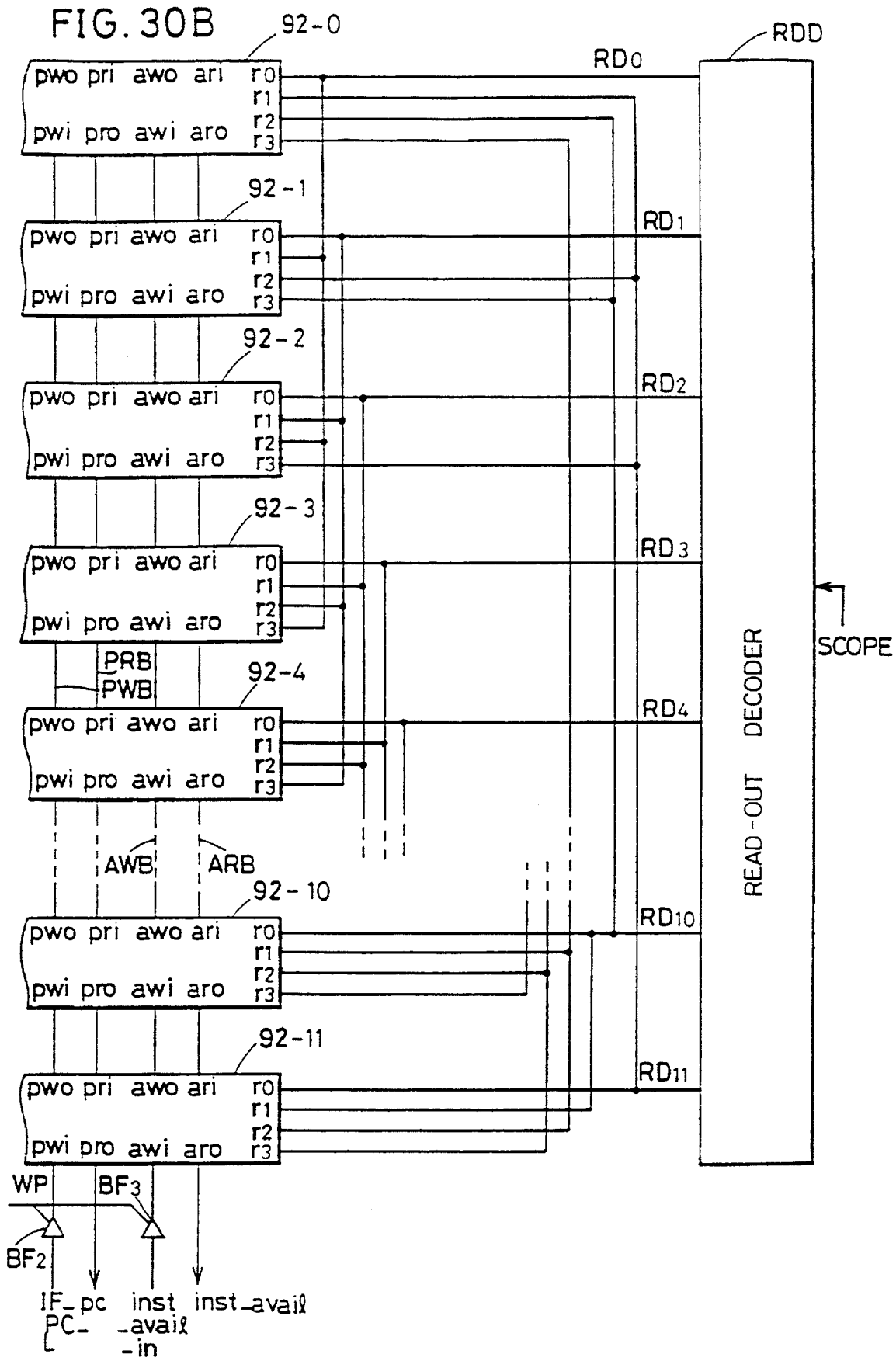

FIG. 30 schematically shows a whole construction of the queue. In FIG. 30, the queue 9 includes a write decoder WRD which decodes the address queue_top and generate a signal for selecting four entries, a read decoder RDD which decodes the address scope and generates a signal for selecting four entries from which instructions are to be read, and entry memory devices 92-0, 92-1, . . . 92-11 which each form one entry region and are arranged in parallel for storing the addresses, instructions and availability flags.

The write decoder WRD and read decoder RDD are responsive to the applied addresses queue_top and scope to perform decoding operations in accordance with change thereof, respectively. Thus, these write and read decoders WRD and RDD statically perform asynchronous decoding operations and particularly do not use control signals which define operation timings of these write and read decoders WRD and RDD.

To the write decoder WRD are coupled twelve write word lines WD0–WD11, one of which is selected in accordance with the address queue_top. Similarly, the read decoder RDD has twelve read word lines RD0–RD11, one of which is selected in response to the address scope. As will be described in greater detail later, one write word line WDi (i=0, 1, . . . 11) and one read word line RDi are coupled to continuously adjacent four memory devices. Therefore, when one write word line or one read word line is selected, four entry memory devices are simultaneously selected.

The entry memory devices 92-0, 92-1, . . . 92-11 each include write access gates w0, w1 and w3, and read access gate r0, r1, r2 and r4 for selecting a data read path. By selecting one of these write access gates wj (j=0–3) and read access gates r0–r3, the write/read port for the data is selected. Four adjacent entry memory devices are coupled at respectively different write address gates to a common write word line WDi. Similarly, four adjacent entry memory devices are coupled at respectively different read access gates to one common read word line RDi.

For example, to the word line WD0, there are coupled a write access gate w0 of the memory device 92-0, write access gate w1 of the memory device 92-1, write access gate w2 of the memory device 92-2, and write access gate w3 of the memory device 92-3. Similarly, to the read word line RD0, there are coupled a read access gate r0 of the memory device 92-0, read access gate r1 of the memory device 92-1, read access gate r2 of the memory device 92-2 and read access gate r3 of the memory device 92-3.

The entry memory devices 92-0–92-11 each include a write data input port iwi, write data output port iwo, read data input port iri, read data output port iro, write address input port pwi, write address output port pwo, read address output port pro, read address input port pri, write availability flag input port awi, write availability flag output port awo, read availability flag output port aro and read availability flag input port ari.

All the write instruction IO (input/output) ports iwi and iwo of the memory devices 92-0–92-11 are coupled to a common instruction write bit line IWB, and the read instruction IO ports iro and iri are commonly coupled to an instruction read bit line IRB.

The write address IO ports pwi and pwo of the memory devices 92-0–92-11 are coupled to a common address write bit line PWB, and the read address IO ports pro and pri are commonly coupled to an address read bit line PRB.

The write availability flag IO ports awi and awo of the memory devices 92-0–92-11 are coupled to a common availability flag write bit line AWB, and the read availability flag IO ports ari and aro are commonly coupled to an availability flag read bit line ARB.

The instruction write bit line IWB, instruction read bit line IRB, address write bit line PWB and address read bit line PRB have bit widths enough to transmit data for four instructions, and in this embodiment, the bit widths of 4*32=128. The availability flag write bit line AWB and availability flag read bit line ARB have widths of 4 bits. These read bit line and write bit line simultaneously transmit contents for four instructions.

Each of input and output ports of the memory devices 92-0–92-11 has four ports, one of which is selected by the write access gate w0–w3 and read access gate r0–r3. Therefore, respectively different input ports and output ports are selected in four entry memory devices which are simultaneously selected.

In order to perform input and output of information, there are provided a write pulse generator WPG which is responsive to the write enable signal wen generated from the queue avail logic 34 in FIG. 8 to generate a write pulse WP, and tri-state buffers BF1, BF2 and BF3 which are turned on in response to a write pulse WB from the write pulse generator WPG. The tri-state buffers BF1–BF3 set their output state at high-impedance states when the write pulse WP is not generated.

The tri-state buffer BF1 receives the instruction IC-data from the instruction memory and transmits the same to the instruction write bit line IWB. The tri-state buffer BF2 transmits the address IF_PC_L to the address write bit line PWB. That tri-state buffer BF3 transmits the availability flag inst_avail_in to the availability flag write bit line AWB. The instruction read bit line IRB supplies the instruction inst which is transmitted to the latch circuit 14. The address PC is read from the read bit line PRB and is transmitted to the L-latch circuit 15. The availability flag inst_avail at the read bit line ARB is supplied to the L-latch circuit 16.

An operation of the queue shown in FIG. 30 will be briefly described.

First, a data writing operation will be described. In accordance with the address queue_top, the write decoder WRD selects one write word line WDi. Thereby, continuously adjacent four entry memory devices are selected, and respectively different input ports thereof are selected. This enables simultaneous writing in the four entry memory devices. Then, if there is an empty region in the queue 9, the write enable signal wen from the queue avail logic 34 is set at ON. In response to this, the write pulse generator WPG generates the write pulses WP at predetermined timings. These write pulses WP render the tri-state buffers BF1–BF3 conductive, so that the write data is transmitted to the corresponding ports of the selected entry memory devices, and thus the instructions, addresses and availability flags are simultaneously written in the four entries.

A reading operation is performed in a similar manner. Upon application of the address scope, the read decoder RDD selects one read word line RDi, and respectively different read access gates are selected from the four entry memory devices. Thereby, contents of the four entries can be simultaneously read from the four entry memory devices. The data thus read are transmitted through the read bit lines IRB, PRB and ARB to the corresponding latch circuits 14, 15 and 16.

Figure 31:
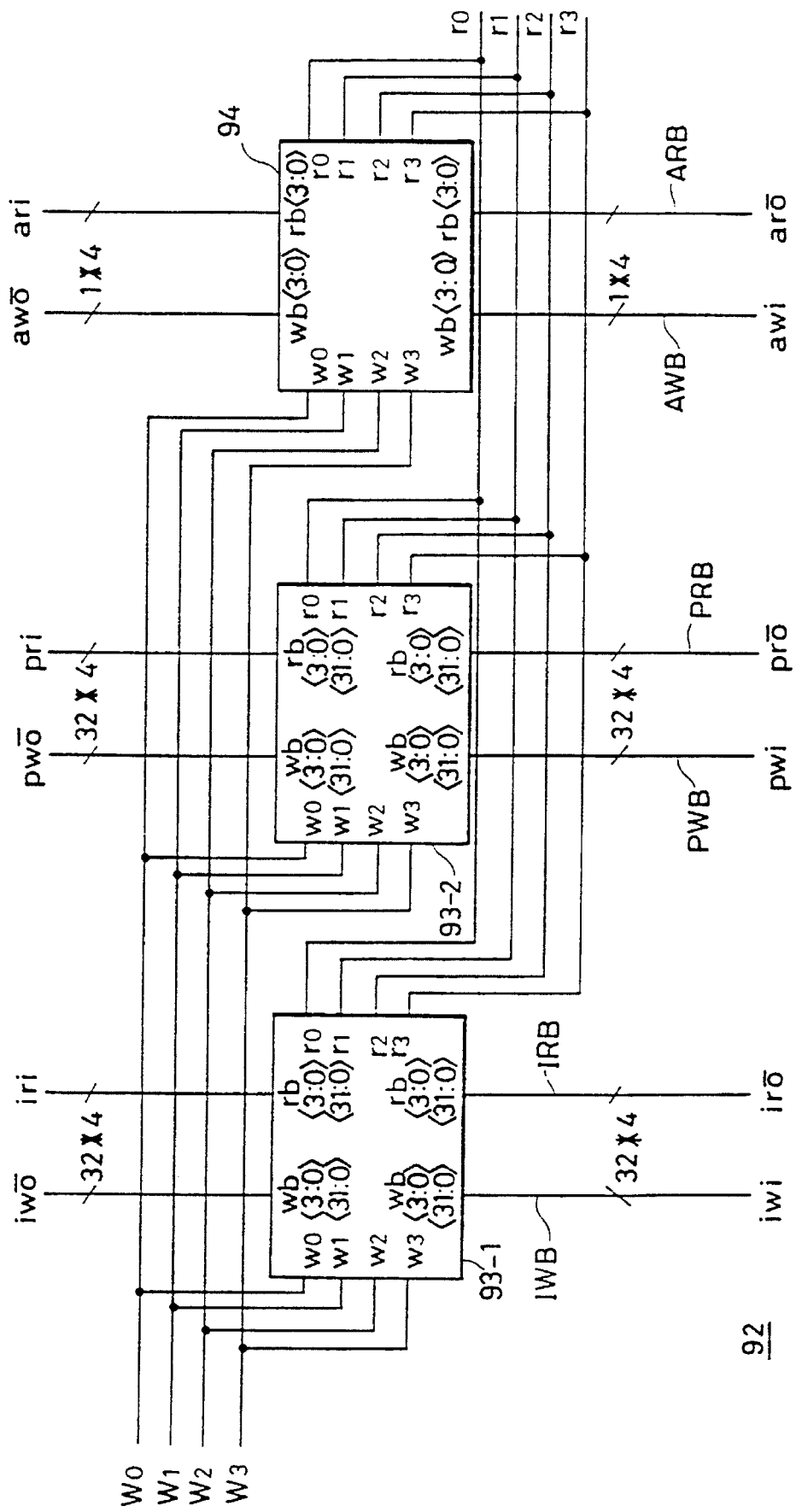
FIG. 31 shows a construction of an entry memory device shown in FIG. 30.

FIG. 31 shows a construction of one entry memory device. In FIG. 31, at a reference number "92" is generally indicated one entry memory device, which includes an instruction memory device 93-1, address memory device 93-2 and availability flag memory device 94. The instruction memory device 93-1 and the address memory device 93-2 have similar constructions, and each include a write port selecting gate wb, read port selecting gate rb, write access gates w0–w3 and read access gates r0–r3. A term <3:0>of the gates wb and rb indicates a fact that both the input and output ports are 4 (from 0 to 3) in number, and <31:0> indicates a fact that data of 32 bits is sent from one selected port. Therefore, among the signal lines of 128 bits including the instruction write and read bit lines IWB and IRB and the address write and read bit lines PWB and PRB, the signal lines of 32 bits are used by one memory device. Signal lines of 32 bits which are actually used are determined by the selection of the access gates wb0–wb3 and r0–r3.

The availability flag memory device 94 includes a write port selecting gate wb and a read port selecting gate rb as well as write access gates w0–w3 and read access gates r0–r3. This write port selecting gate wb has four ports from 0 to 3, one of which is selected for inputting and outputting the availability flag of one bit therethrough. Thus, by selecting the access gates wo–w3 and r0–r3, one bit among 4 bits of the flag write and read bit line AWB and ARB is used by one availability flag memory device 94.

Figure 32:
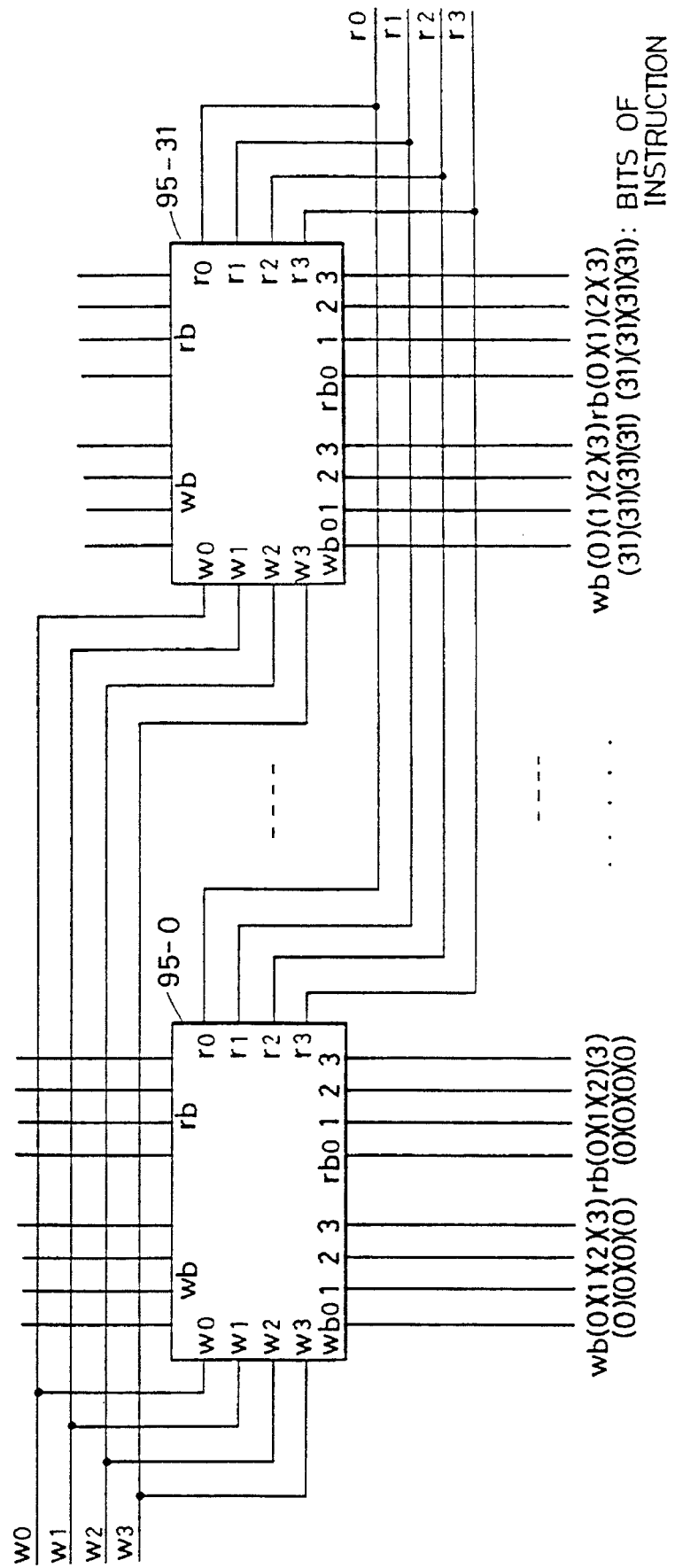
FIG. 32 shows a construction of an instruction memory device and an address memory device shown in FIG. 31.

FIG. 32 specifically shows a construction of the instruction memory device 93-1 and the address memory device 93-2. The memory devices 93-1 and 93-2 have the similar construction, and thus are generally represented as a memory device 93. Referring to FIG. 32, both the instruction memory device 93-1 and the address memory device 93-2 include bit memory devices 95-0–95-31 of 2 bits. The bit memory devices 95-0–95-31 store 0th–31st bits of the address or instruction, respectively. Each of the bit memory devices 95-0–95-31 includes write port selecting gates wb0, wb1, wb2 and wb3, read port selecting gates rb0, rb1, rb2 and rb3, write access gates w0–w3 and read access gates r0–r3. The selection of the gates wb0–wb3 and rb0–rb3 are performed by the selection of the access gates w0–w3 and r0–r3. To the write access agates w0–w3 of the bit memory devices 95-0–95-31 are transmitted the same access gate selecting signals w0–w3 (signal lines and signals transmitted thereto are indicated by the same reference characters), respectively. Also, the same read gate selecting signals r0–r3 are transmitted to the read access gates r0–r3, thereby 32 bits of the address or instruction are simultaneously selected.

The availability flag memory device 94 has a construction similar to those of these bit memory devices 95-0–95-31.

Figure 33:
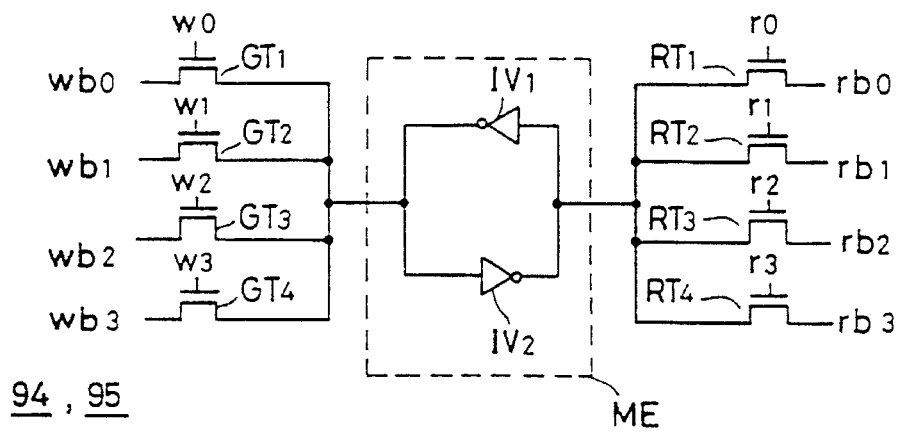
FIG. 33 shows an example of a construction of an instruction and address memory devices as well as an availability flag memory device shown in FIG. 32.

FIG. 33 shows an example of a specific construction of the bit memory device and availability flag memory device. In FIG. 33, the bit memory device (and the availability flag memory device) has write port selecting transistors GT1–GT4, read port selecting transistors RT1–RT4 and a memory element ME for storing data of one bit. The memory element ME includes two inverters IV1 and IV2 which are in anti-parallel coupling or cross coupling. Thus, the memory element ME is formed of an inverter latch.

The gate transistor GT1 receives at its gate the port selecting signal w0 to couple the memory element ME to the port wb. The gate transistor GT2 responds to the port selecting signal w1 by coupling the memory element ME to the port wb1. The gate transistor GT3 responds to the port selecting signal w2 by coupling the memory element ME to the port wb2. The gate transistor GT4 responds to the port selecting signal w3 by coupling the memory element ME to the port wb3.

A reading path is similar to the above. Specifically, the transistors RT-1–RT-4 respond to the read port selecting signals r0–r3 by coupling the memory element ME to the ports rb0–rb3, respectively.

Figure 34:
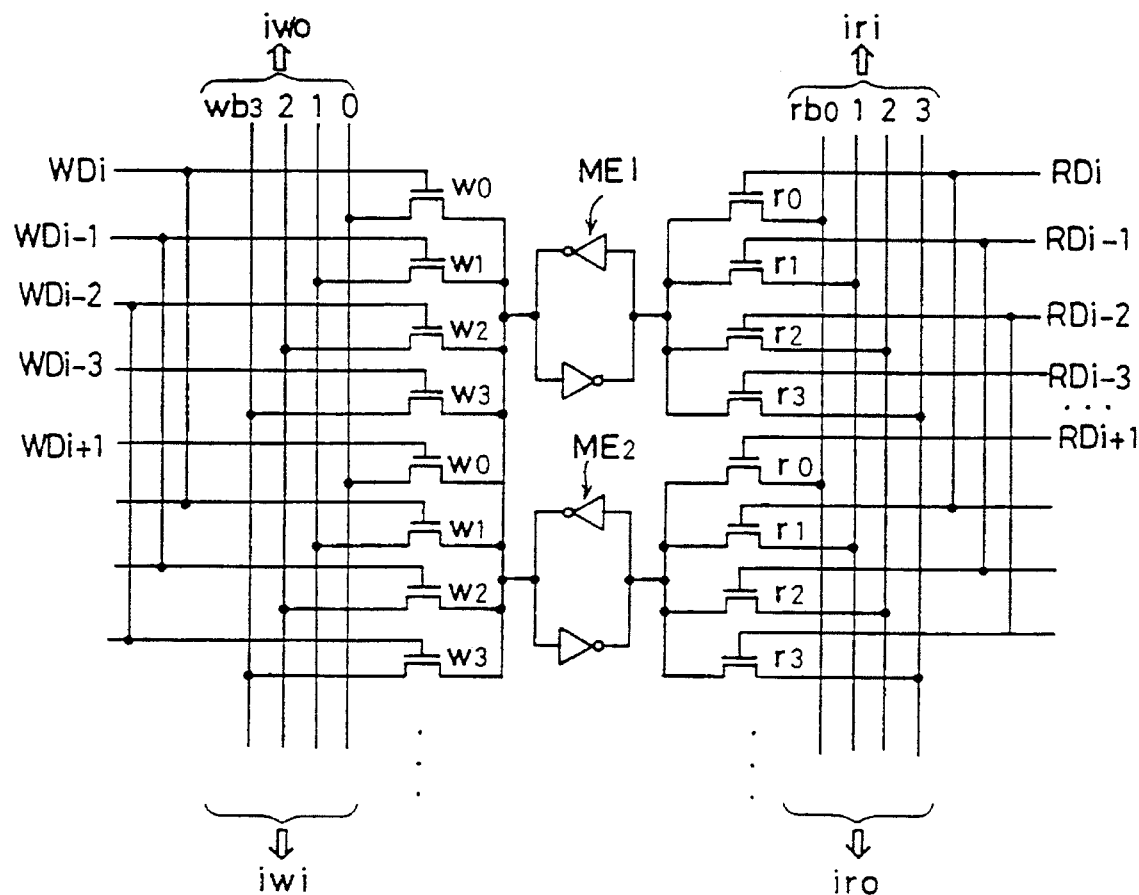
FIG. 34 shows an example of a coupling configuration of a bit memory device shown in FIG. 33.

FIG. 34 shows a coupling configuration between different entries of the bit memory devices and availability flag memory devices. As shown in FIG. 34, the port wb0–wb3 and rb0–rb3 are common to the memory devices of the same bits, respectively, and the availability flag memory devices are common to all the memory devices.

An operation of the bit memory device (availability flag memory device) will be described below. If one of the write word lines is selected by the write word selecting signal WRD, one gate transistor GTi is turned on in the construction in FIG. 33, and the memory element ME is coupled to one of the ports wb0–wb3. Thereby, data is written in the memory device ME through the selected port. Data reading is performed in a similar manner. That is; the read decoder RDD selects one read word line, whereby one of the transistors RT1–RT4 is turned on, and thus the memory element ME is coupled to one of the ports rb0–rb3. In this manner, the data is read.

As shown in FIG. 34, by setting one write word line WDi at the selected state, different ports are selected in the adjacent entry memory devices. For example, in FIG. 34, a memory element ME1 is coupled by the selecting signal WDi to the port wb0, and a memory device ME2 is coupled to the port wb1. Thereby, respective bits of four different instructions can be simultaneously written in four different memory elements. Data reading is performed in a similar manner. By setting one read line RDi at the selected state, the memory elements ME1, ME2, . . . are coupled to different ports, and contents of the four entries are simultaneously transmitted to respectively different ports, so that four instructions, addresses and availability flags can be simultaneously read.

Then, an operation during the data reading of the queue 9 will be described with reference to FIG. 35.

Figure 35:
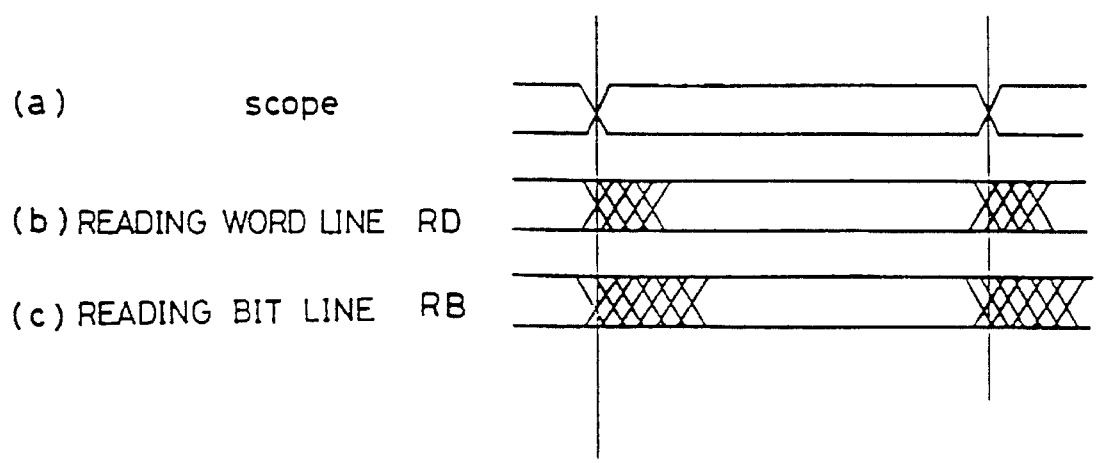
FIG. 35 is a signal waveform diagram showing an operation of a queue during data reading.

In an operation waveform diagram shown in FIG. 35, the instruction read bit line IRB, address read bit line PRB and availability flag read bit line ARB are representatively shown as the read bit lines RB. When the address scope is applied, an output of the read decoder RDD changes in accordance with the change of the address scope. The output state is defined after a certain period of time, and one read word line RD is set at the selected state. In the operation waveform diagram shown in FIG. 35, there are shown signal waveforms of all read word lines and states of all signals of the selected and unselected read word lines. When a signal potential of the selected word line (e.g., RD0) is defined, the read access gate of the entry memory device is set at the selected state. In this case, access gates r0, r1, r2 and r3 of the memory devices 92-0–92-3 are respectively selected, and the respectively different data read ports are selected for reading the data to the corresponding ports. Thereafter, the transistors RT1–RT4 defines the signal states of the reading bit lines RB. The signal potentials of the signal bit lines RB are applied to the L-latch circuits 14–16.

Figure 36:
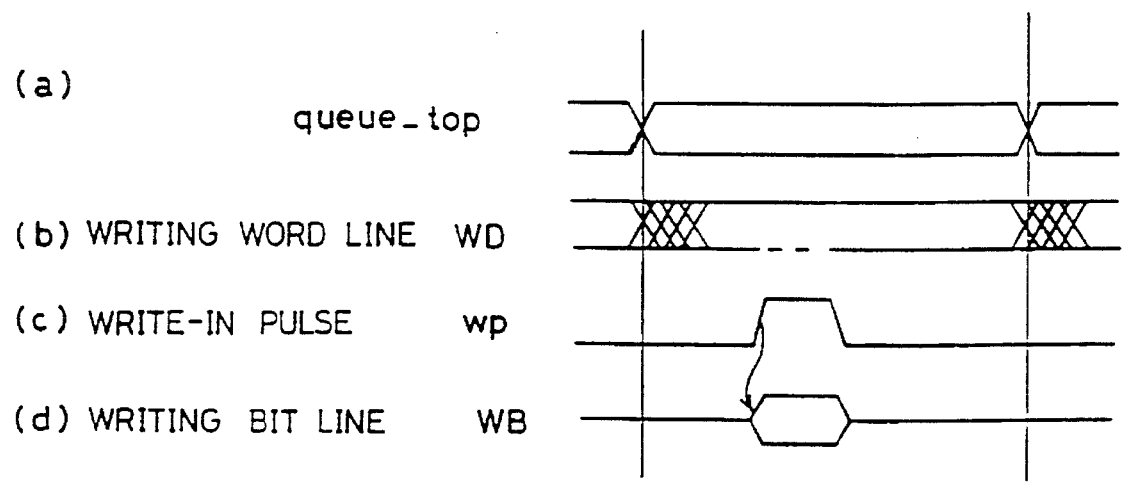
FIG. 36 is a signal waveform diagram showing an operation of a queue during data writing.

FIG. 36 is a signal waveform diagram for showing an operation during the data writing. A data writing operation will be described with reference to FIG. 36.

When the address queue__top is applied, the write decoder WRD starts the decoding operation in accordance with the address queue__top, and the signal potential of the write word line is defined after a certain period of time. Thereby, four entries for writing the data are selected, and also respectively different ports of these four entry memory devices are selected through the access gates w0–w3. After the signal potential of this write word line WD is defined, the write pulse generator WPG generates the write pulses WP at the predetermined timings if the queue 9 has an empty region, and the tri-state buffers BF1–BF3 become conductive to transmit the instruction IC__data, address IF__PC__L and availability flag inst__avail__in to the write bit line WB. The data on this write bit line are simultaneously written in the respective (four) entries which are respectively selected.

For simultaneously reading the written data, the write pulse WP is generated, and the data will be read after the data on the write bit line WB is defined. In this case, the data written in the write bit line is transmitted to the L-latch circuit 14–16 through this entry memory device before these L-latch circuits perform the latch operation.

As described above, when the read queue address queue__top selects one word line WDi, contents of four memory devices 92-i, 92-i+1, 92-i+2 and 92-i+3 are read through the output ports rb0<31:0>, rb1<31:0>, rb2<31:0>and rb3<31:0>. Therefore, by applying the address queue__top to the instruction decoder 26, the address of the branch instruction in the queue 9 can be facilely identified from the output port number and the queue address queue__top.

The memory element ME shown in FIGS. 33 and 34 employs the inverter latch, which may cause inversion of the write data and read data. As a simple countermeasure, the tri-state buffers BF1–BF3 may have inverter structures, and such inverters may be disposed at arbitrary locations.

Owing to the construction described above, different kinds of data (address, instruction and availability flag) can be simultaneously written in the four address regions starting from the address queue__top, and the contents of the entries which have been stored in the four address regions starting from the address scope can be simultaneously read.

Although the memory elements of the memory devices described above are formed of the memory elements of the inverter latch structures, they may have any structure if it can held the data.

The structures of the memory devices are not restricted to those of the entry memory devices described above, and they may have any structures if they are provided with four data write ports and four data read ports and different write/read ports of adjacent four entry memory devices can be selected.

Although the embodiments have been described with respect to the construction in which both the instruction and the address are 32 bits and four instructions are simultaneously read, the instruction lengths of the addresses and the number of the instructions which are simultaneously written and/or read in the queue may be arbitrary lengths and numbers, respectively.

As described above, according to the invention, the decoding stage is provided at a location upstream to the instruction decoder with the queue which simultaneously stores a plurality of instructions by processing, as one entry, the instruction from the instruction memory, the flag indicating the availability/unavailability of this instruction and the address of the instruction. Further, there is provided a construction in which a plurality of instructions simultaneously read from the instruction memory, addresses and flags indicating the availability/unavailability of the instructions are simultaneously stored in the queue, and the write/read in the queue are controlled in accordance with the execution state of the instructions, fetch state and others. Therefore, the instruction can be efficiently supplied to the instruction decoder, and thus the parallel processing apparatus having a high processing speed can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage device comprising:

main output ports;

a plurality of memory units arranged in parallel and each providing an entry storing region;

each of said memory units comprising;

a predetermined number of write selecting gates which are set in a selected state by respectively different write queue addresses;

a predetermined number of read selecting gates which are set in a selected state by respectively different read queue addresses;

input ports coupled to main input ports, output ports coupled to said main output ports; and a storage element for storing data, said input ports comprising sub-input ports which are disposed correspondingly to each of said write selecting gates, and are equal in number to said predetermined number, said input ports further comprising sub-output ports which are disposed correspondingly to each of said read selecting gates, and said write selecting gates and said read selecting gates couple associated memory elements to corresponding sub-input ports and corresponding sub-output ports when set in the selected state, respectively.

2. A storage device according to claim 1, wherein said sub-input ports have first sub-input ports for transmitting data to a memory unit which is adjacent in one side thereof, and second sub-input ports for receiving data from a memory unit which is adjacent in the other side thereof; and said storage device further comprising an input data bus which extends through said first sub-input ports and said second sub-input ports of said memory units for coupling a sub-input port of a selected memory unit to the main input port.

3. A storage device according to claim 1, wherein said sub-output ports have first sub-output ports for receiving data from a memory unit which is adjacent in one side thereof, and second sub-output ports for receiving data from a memory unit which is adjacent in the side thereof; and said storage device further comprising a data output bus which extends through said first sub-output ports and said second sub-output ports of said memory units for transmitting output data of a selected memory unit to said main output port.

4. A storage device according to claim 1, wherein said memory unit stores data of a plurality bits;

said data are applied to said main input ports in such a manner that data bits of the same digit position are successively adjacent to each other, and said data are output from the main output ports in such a manner that data bits of the same digit position are successively adjacent to each other.

5. A device according to claim 1, wherein said write selecting gates include a plurality of write selecting lines which are respectively coupled to the write selecting gates of a predetermined number of said memory units which are successively adjacent to each other, and said write selecting lines are coupled to different selecting gates of successively adjacent memory units.

6. A device according to claim 1, wherein said read selecting gates include a plurality of read selecting lines which are respectively coupled to the read selecting gates of a predetermined number of said memory units which are successively adjacent to each other, and said read selecting lines are coupled to different selecting gates of successively adjacent memory units.

* * * * *